(12) United States Patent
Stewart et al.

(10) Patent No.: US 10,230,242 B2
(45) Date of Patent: *Mar. 12, 2019

(54) MAXIMIZING ENERGY SAVINGS BY UTILIZING CONSERVATION VOLTAGE REDUCTION WITH ADAPTIVE VOLTAGE CONTROL AND PEAK DEMAND REDUCTION AT POINT OF USE

(71) Applicant: Edge Electrons Limited, Hong Kong (HK)

(72) Inventors: Neal George Stewart, Hong Kong (HK); Gordon Currie, Hong Kong (HK); Jian Zapata, Hong Kong (HK); Richard McIndoe, Hong Kong (HK)

(73) Assignee: Edge Electrons Limited, Hong Kong (HK)

( * ) Notice: Subject to any disclaimer, the term of this patent is extended or adjusted under 35 U.S.C. 154(b) by 89 days.

This patent is subject to a terminal disclaimer.

(21) Appl. No.: 15/295,967

(22) Filed: Oct. 17, 2016

(65) Prior Publication Data
US 2017/0063087 A1     Mar. 2, 2017

Related U.S. Application Data

(63) Continuation-in-part of application No. 14/511,187, filed on Oct. 10, 2014, now Pat. No. 9,819,185.

(51) Int. Cl.
*H02J 3/10*       (2006.01)
*H02J 3/18*       (2006.01)
(Continued)

(52) U.S. Cl.
CPC ............... *H02J 3/387* (2013.01); *H02J 3/12* (2013.01); *H02J 3/18* (2013.01); *H02J 3/386* (2013.01);
(Continued)

(58) Field of Classification Search
CPC ...... H02J 3/12; H02J 3/18; H02J 3/386; H02J 3/387; H02J 3/14; H02J 3/381;
(Continued)

(56) References Cited

U.S. PATENT DOCUMENTS

| 7,269,038 | B2* | 9/2007 | Shekhawat | ............. H02M 1/42 363/71 |
| 2008/0164763 | A1* | 7/2008 | Mount | .................... H02J 9/062 307/66 |

(Continued)

FOREIGN PATENT DOCUMENTS

WO          2015184804 A1     12/2015

OTHER PUBLICATIONS

International Search Report of PCT/IB2017/056399 dated Jan. 25, 2018.

*Primary Examiner* — Rexford Barnie
*Assistant Examiner* — Elim Ortiz
(74) *Attorney, Agent, or Firm* — Idea Intellectual Limited; Margaret A. Burke; Sam T. Yip

(57) ABSTRACT

In the present legacy electrical power generation and distribution system, the power quality delivered to end consumers is being degraded by a number of disruptive technologies and legislative impacts; especially with the rapidly increasing myriad of privately owned and operated domestic and commercial distributed energy generation (DEG) devices connected at any point across a low voltage (LV) distribution network. The present invention bypasses this increasing critical DEG problem by offering a solution comprising an energy processing unit (EPU) that is installed at the customer's electrical power point of use (POU). And because of the controlled tightly voltage regulated output of the EPU, significant energy savings can be achieved through dynamic voltage control, utilizing the CVR effect, reduced reactive (Continued)

power demand, and reduced or eliminated peak demand billings.

17 Claims, 13 Drawing Sheets

(51) Int. Cl.
  *H02M 3/38* (2006.01)
  *H02J 3/38* (2006.01)
  *H02J 3/12* (2006.01)
  *H02J 3/14* (2006.01)

(52) U.S. Cl.
  CPC .................. *H02J 3/14* (2013.01); *H02J 3/381* (2013.01); *H02J 3/383* (2013.01); *Y02B 10/14* (2013.01); *Y02E 10/563* (2013.01); *Y02E 10/763* (2013.01); *Y02E 40/30* (2013.01); *Y10T 307/352* (2015.04)

(58) Field of Classification Search
  CPC ........ H02J 3/383; Y02B 10/14; Y02E 10/563; Y02E 10/763; Y02E 40/30; Y10T 307/352
  See application file for complete search history.

(56) References Cited

U.S. PATENT DOCUMENTS

| | | | |
|---|---|---|---|
| 2014/0074311 A1* | 3/2014 | Kearns | H02J 3/38 700/297 |
| 2014/0153298 A1* | 6/2014 | Kazanbas | H02M 7/538 363/37 |
| 2015/0102669 A1 | 4/2015 | Stewart | |
| 2015/0115913 A1 | 4/2015 | Stewart et al. | |
| 2015/0236549 A1* | 8/2015 | Budde | H02J 9/061 307/23 |
| 2016/0218635 A1 | 7/2016 | Stewart et al. | |

* cited by examiner

MAXIMIZING ENERGY SAVINGS BY UTILIZING CONSERVATION VOLTAGE REDUCTION WITH ADAPTIVE VOLTAGE CONTROL AND PEAK DEMAND REDUCTION AT POINT OF USE

CROSS-REFERENCE OF RELATED PATENT APPLICATIONS

This application is a continuation-in-part (CIP) application of U.S. patent application Ser. No. 14/511,187 filed Oct. 10, 2014, the disclosure of which is incorporated herein by reference in their entirety. This application is related to U.S. Pat. No. 9,148,058 issued Sep. 29, 2015, U.S. patent application Ser. No. 14/565,444 filed Oct. 10, 2014, and PCT International Application No. PCT/CN2015/070538 filed Jan. 12, 2015, and PCT International Application No. PCT/CN2016/075144 filed Mar. 1, 2015, the disclosures of which are incorporated herein by reference in their entirety.

FIELD OF THE INVENTION

The present invention generally relates electrical power generation and distribution. Particularly, the present invention relates to methods and systems for solving the increasing power quality degradation of the present legacy electrical system because of evolving technology and legislative impacts, such as Distributed Energy Generation (DEG).

BACKGROUND

The present legacy electrical system and power quality being delivered to users is being degraded by a number of disruptive technology and legislative impacts, especially with the rapidly increasing myriad of privately owned and operated domestic and commercial Distributed Energy Generation (DEG) devices connected at any point across a low voltage LV power distribution network. This increasing degradation in power quality being delivered to the end consumers, especially voltage volatility, current and frequency aberrations, can negatively impact the performance or even damage electrical equipment, appliances, and electronic devices connected to the electrical power system in the user premises, and can even trip and disrupt wider area LV power distribution network, substation protective equipment, high voltage (HV) transmission grids, and even generators.

Referring to FIG. 1. The legacy alternate current (AC) electrical power systems which started in the later 1800's had limited transmission capabilities due to low voltage components, and over short distances. So a myriad of separate independent power producers (IPP)'s sprang up with a central generator and supplied power to local areas or local power islands. Back then, there were a range of voltages and various frequencies for each local area or local power island. The loads were simple which comprised largely incandescent electrical lighting.

Referring to FIG. 2. As electrical technologies advanced, with HV insulators and switches, transmission voltages were allowed to be increased hence enabling the delivery of higher electrical power over longer distances. Voltage levels increased rapidly from Edison's initial 220 VDC local grids, to the first AC grids of 2.3 KVAC (1893), rising every few years to 765 KVAC (late 1960's). With longer transmission grids resulted in overlapping power islands, conflicts began in areas of business, competing technical standards, and finally monopolies emerged. With the increasing use of electrical power, questionable reliability, and growing conflicts in the electrical industry, many countries moved to legislate regulatory controls over their electrical industries.

In the United States, it became critical that the rapidly growing electrical industry be regulated to create national standards that also would allow multiple grid interconnections to create stable power networks across the country with the goal of delivering high quality reliable power to the consumers. The Federal Government in the 1992 Congress passed the Energy Power Regulatory legislation at the Federal level. So FERC (Federal Energy Regulatory Commission) was charged with regulating power quality from the central power utilities, who owned the generators, transmission, and distribution networks end to end. Then in 1996, in order to increase competition and optimize the cost of electrical power, FERC deregulated the electrical industry further and ruled that generation, transmission and distribution of electrical power must be conducted by legally separate entities. This created the competitive market for wholesale power available on the transmission grids with the generators selling and the distributors purchasing wholesale power from the transmission companies.

Many countries enacted similar deregulated competitive electrical power structures in the 1900's. In the United States, after a major North East Blackout in 1965, the NERC (North American Reliability Council) was created to maintain and enforce system standards and power quality reliability. Then again, after another major Blackout in North East and Canada Aug. 14, 2003, the Federal Government in June 2007 passed even tighter regulatory laws and penalties on the transmission operators mandated legally by the NERC working with FERC.

Referring FIG. 3. Reaching the present day, what came with the deregulation legislation was DEG, which was the ability of connecting small power generators to the HV transmission grids. With still further technology advances in power generation such as CHP micro-turbines, fuel cell installations, and especially renewable energy sources such as photovoltaic (PV), solar thermal, and wind, coupled with falling capital costs, private owners in domestic and commercial premises have stated purchasing and installing these small DEG devices.

These small privately owned and operated domestic and commercial DEG device installations accelerated with the introduction of then later updated and modified Feed in Tariff (FIT) policy over the last few years. The FIT mandates transmission operators to pay owners of DEG devices minimum prices for excess power being generated and added back into the energy grid. So now with a myriad of privately owned and operated domestic and commercial DEG devices, connected in increasing numbers to the local LV distribution networks, it is creating a large impact on power quality for not only the end consumers, but the increasing real possibility of wide area major grid disruptions. Especially with the increasing chances of a transmission grid trip due to the reduction of spinning reserves with the offloading of the large central utilities due to additional power being generated by the growing number of installed DEG devices. The resultant voltage, current and frequency aberrations from these privately owned and operated domestic and commercial DEG devices that are superimposed onto the distribution networks and transmission grids increases the possibility of setting off the system trip protective switch gear, normally adjusted to the tight tolerance and long established legacy electrical power specifications.

Furthermore, because of these increasing voltages on the distribution networks, when over the regulated voltage limits the DEG interface control electronics disables the DEG interface, it does not only shut off any DEG energy recovery from the DEG installation but also eliminates any FIT recovery for the end consumers. Hence the more DEG interfaces connect along a local distribution network, for example a neighborhood of domestic PV installations, as the distribution network voltages increase because of the amount of excess energy being delivered into the distribution network by the DEG installations, the more number of these DEG interfaces will be disabled by the DEG interface control electronics, with no energy recovery or FIT for the end consumers.

Power quality is defined under the following specifications, the key parameters being consistent and stable voltage, harmonics, and frequency of the electrical power delivered to the user. With the advent of more and more electronic devices and equipment being connected to the electrical system which are complex electrical loads, especially with the increasing power demand being domestic and commercial, rather than industrial such as in the United States, these electronic devices, since they offer more complex loads to the electrical system, they can introduce electrical power instability, and these electronic devices are generally located in domestic and commercial premises with increasing power demands from the LV distribution networks, adding to the voltage instability with changing loads and power factors across the distribution networks.

When the legacy central generating utilities owned the complete equation of generation, transmission and distribution end to end, they agreed to, and could meet, the legislated tight power quality standards specified and enforced by government and regulatory bodies. With the advent of even further de-regulation of the electricity industry in many countries, and expanding FIT, allowing the connection of an increasing myriad of privately owned and operated domestic and commercial DEG devices to the LV distribution network and increasing complex loads and changing power factors, there is an increasing critical degradation of power quality especially voltage instability and increased potential of excessively high voltages being delivered to customers' premises, with the added consumption of wasted energy.

Electrical equipment, appliances, electronics, and especially electrical motors, are all designed to perform optimally at the legislated voltage and frequency tight set legacy standards. Electrical and electronic devices subjected to these voltage and frequency aberrations, outside the set tight legacy tolerances, can malfunction, degrade performance, be damaged, and even wastes energy.

These power quality standards have a long history of regulatory normalization across each country, and even across the world, particularly with the advent of electrical transmission major grid connections between countries. Examples of electrical LV distribution mains standards by some countries are as follows, referencing nominal voltage, voltage tolerance, nominal frequency, and frequency tolerance, for the LV distribution network for domestic and commercial users:

| Country | Regulatory | Nominal Voltage (VAC RMS) | Voltage Tolerance (%) | Normal Frequency (Hz) | Frequency Tolerance (%) |
|---|---|---|---|---|---|
| USA | FERC/NERC | 120 (1Φ) 240 (1Φ) 120/208 (3Φ) | ±5 | 60 | ±1 |
| UK | EN50160 | 230 (1Φ/3Φ) | +10, −6 | 50 | ±1 |

Many countries have similar nominal LV Distribution POU voltages such as 220/230/240 VAC (and trending this higher distribution network voltage to 230 VAC), and lower voltages generally 110/115/120 VAC, with Frequency now standard at 50 Hz or 60 Hz. Generally 50 Hz for the higher 220/230/240 VAC voltages, and 60 Hz for the lower 110/115/120 VAC voltages, but either frequency is used in some countries due to their electrical power system history. Voltage tolerance can be standardized at ±5%/6%/+10, −6%/±10%, the maximum tolerance in any country is set at ±10%.

Frequency tolerance is normally standardized in many countries to ±1%, some countries have ±2%, which is the maximum frequency tolerance allowed.

Power quality problems are associated with voltage or frequency deviating outside the specified regulatory set and enforced limits. Voltage magnitude problems can be:

11) Rapid voltage changes;
12) Low frequency voltage change causing flicker;
13) Under voltage dips (under −10%);
14) Over voltage surges (Over +10%)
15) Overvoltage spikes and noise;
16) Voltage unbalance in 3-phase system;
17) Voltage and current harmonics;
18) Power factor (PF)—the phase of the voltage and current being out of phase due to reactive power imbalance referred to as power factor (PF=1, V and I in phase, PF=0, V and I−180° out of phase) can also create not only voltage and current harmonic problems, but also electrical and electronic equipment, and especially in electrical motors, wasted power, under performance, and also possible damage;
19) Current imbalance in the 3-phase system, where each phase is loaded with unequal currents can cause transmission and distribution equipment problems and degraded power quality; and
20) Frequency deviations also can impact performance and operation of electrical and electronic devices, transformers, and electrical motors;

Because of these increasing voltages on the distribution networks, when over the regulated voltage limits the DEG interface control electronics disables the DEG interface hence not only shuts off any DEG energy recovery from the DEG installation but also eliminates any FIT recovery for the user. Hence the more DEG interfaces connected, for example domestic houses, along a local distribution network, for example a neighborhood of domestic PV installations, as the distribution network voltages increase because of the amount of excess energy being delivered into the distribution network by the DEG installations, a significant number of these DEG interfaces will be disabled by the DEG interface control electronics, with no energy recovery or FIT for the users.

All of these power quality issues degrade the power quality being delivered to users, especially voltage instability across and through the LV distribution network at POU, where now, in addition, the myriad of privately owned and operated domestic and commercial DEG devices being connected, excess power generated by these DEG devices is being loaded back onto the local LV distribution network. Also, these privately owned and operated domestic and commercial DEG devices, even though they have to meet performance test specifications, IEC 61215 (Ed. 2—2005) and IEC 61646 (Ed. 2—2008), they can still set up widely varying Voltage, Frequency and rapid power fluctuations, on the local LV distribution network at POU. These domestic and commercial DEG devices are small PV installations, micro-wind, micro-hydro, CHP micro-turbine, CHP fuel cells, and possibly hybrid automobiles in the future. Also, these problems can also reduce the efficiency of electrical power usage in the electrical and electronic loads at the POU. For example electrical motors waste power when they are driven at a higher voltage than the electric motor was designed for optimal performance. And since in the PF equation, KVAR is proportional to the voltage squared, the higher the voltage the more wasteful reactive power has to be delivered by the grid. Also, there is a movement in the electricity generation and distribution industry to charge customers for peak demands based upon the peak KW used. With higher voltages, KW peak demands will increase, as will the charges to customers.

The large renewable industrial PV, solar thermal, wind and hydro installation need large physical areas away from population centers, the power users, hence the large industrial installations need end to end HV Transmission over generally long distances, so these large installations can be owned and controlled by the utility generator, hence can meet and be responsible for the Transmission Operator regulated power quality standards.

The advantage of the large numbers of small privately owned and operated domestic and commercial DEG devices, is the power is generated locally, close to the users or POU, through the LV distribution network. But the owners of these privately owned and operated domestic and commercial DEG devices, purchase, install and operate these DEG devices, but have no responsibility for the impact on the local LV distribution network power quality. These legacy local LV distribution networks in most cases were not initially designed for large number of domestic and commercial DEG devices to be connected. So there is real and increasing concern by the regulatory bodies, with the increasing penetration of these privately owned and operated domestic and commercial DEG devices, not only user power quality being degraded, but local power instability on the LV distribution networks. Added to this is the increasing connection of complex loads, changing power factors, and changing loads across the distribution networks. This results in increasing service disruptions over even large areas and even HV transmission grids due to voltage, current, or frequency aberrations outside the tight tolerance electrical standards that can trip voltage, current, or frequency electrical system safety and protection devices, causing electrical disruptions and outages. Also because of these increasing and sometimes excessive voltages on the distribution networks, there is significant wastage of energy, due to reduced efficiency of loads, higher reactive power absorbed, and also now customers being billed for increased KW Peak Demand.

The electrical power industry and regulatory bodies are grappling with this new and disruptive evolution in the legacy electrical system. Suggested solutions to this increasing and real problem are all aimed at maintaining the legacy and historical transmission and distribution network structure and power quality tolerances.

One significant book, which is dedicated solely to the looming problem of increasing penetration of privately owned and operated domestic and commercial DEG devices is titled "Integration of Distributed Generation in the Power System", authored by Math Bollen and Fainan Hussan. The content of which is incorporated herein by reference in its entirety. This book was only recently published in 2011 by IEEE, and the book represents a detailed in-depth-study of over a 10 year period, all related to the disruptive evolution of privately owned and operated domestic and commercial DEG devices on power quality.

This book has 470 references, and is excellent in its in-depth research on detail to the increasing critical aspects of the disruptive impact of DEG devices on the overall electrical power system. Many authors and institutions present similar solutions to solving this problem, the same solutions as also covered fully in detail in this book, and again all aimed at maintaining the legacy electrical standards power quality tolerances, by protecting and controlling the HV transmission grid and LV distribution networks. But again, all of these solutions suggested are solely to maintain these historical, long established over many decades, of legacy tight tolerance electrical industry standards. This deeply researched and detailed book finally concludes in its recommendations to address the critical problems of the increasing connection of larger numbers of privately owned and operated domestic and commercial DEG devices, is by adding a layer of digital communication networks to link the DEG devices back to controlling and protecting the HV transmission grids, or even this digital communication network can precipitate tripping voltage protection relays on the distribution network feeders, or even disconnecting DEG devices if say overvoltage results. The book also suggests various schemes of adding storage, and other load shifting actions based upon the added digital communication network of shifting reserves to customers or DEG devices.

The book also concludes another possible conventional solution because of the concerns of the large cost, time, and complexity involved to add the extensive sophisticated digital communication networks and software algorithms that would be required, so in their final paragraph on page 470—"Next to these advanced solutions, the classical solution of building more stronger lines or cables should not be forgotten. However, the introduction of new types of production will require use of advanced solutions in more cases than in the past. By combining the classical and advanced solutions, the power system will not become an unnecessary barrier to the introduction of distributed generation."

So this last paragraph of the book on page 470, sums up their concerns of the increasing penetration of privately owned and operated domestic and commercial DEG devices on the LV distribution network in particular, and its potential critical impact on the stability of the overall electrical grid. They propose advanced digital communication networks and software solutions ("Smart Grid"), but also suggest a simple, but expensive, conventional physical solution in adding more copper wire to the existing LV distribution networks that will increase the power handling capability and reduce Voltage instability by decreasing the resistance of the wires in the present LV distribution networks as these DEG devices add increasing and volatile power onto the local LV distribution networks. These LV distribution networks were initially not designed, and certainly this new DEG problem, not anticipated, with this recent evolution of the connection of large numbers of privately owned and operated domestic and commercial DEG devices.

The last paragraph in this detailed book underlines clearly that:

7) All solutions suggested are aimed and still meeting the present tight tolerances of the historical legacy Regulated and enforced electrical standards for power quality;
8) Connection of large numbers of privately owned and operated domestic and commercial DEG devices to the local LV distribution networks is a major problem, as the LV distribution networks were not initially designed to handle this new disruptive electrical evolution, hence the suggestion of physically upgrading these LV distribution networks underlines the complexity of this real and critical problem;

9) The book's last line suggests, because of the complexity and cost and time for these advanced complex "digital" solutions ("Smart Grid"), that just adding additional copper wires to the present LV distribution network will help. But that is also a very expensive solution, to upgrade physically the LV distribution networks, and will take many years to complete;

10) With these critical problems now happening with the degradation of power quality and possible widespread Transmission grids tripping, there may be legislative moves to limit the number of privately owned and operated domestic and commercial DEG devices allowed to be installed;

11) The book also has no suggestion on who would be responsible for the costs of the huge digital communication software network and who has final responsibility for power quality delivered to the user; and 12) Again, the book, and all suggestions in the industry, surrounding this recently evolving DEG devices problem, is the underlying, totally accepted without question, in maintaining the historical, legacy, Regulated power quality tight specifications and framework, and still meeting the decades old legacy electrical system power quality tight tolerance standards.

SUMMARY

So far, solutions that have been proposed by the industry attempt to solve this increasing critical problem due to the introduction of DEG by targeting the power generation, HV transmission, and/or LV distribution without real success. The present invention, however, approaches the problem by targeting directly the electrical power point of use (POU), so that high quality electrical power can be restored directly at each POU. As such, the present invention transforms the tightly legislated and regulated legacy "electrical grid" into a sort of "open-source" energy grid with wide tolerance. In this "open-source" energy grid, an individual energy processing unity (EPU) device is installed at each end consumer's POU. These EPU devices are specifically designed to tolerant very wide ranges of voltage, current, and frequency variation—"dirty power" on the input, and processes the input "dirty power" to produce clean high quality power at the output delivered directly at the POU. The present invention then enables the LV distribution network in particular to handle the increasing number of connections of privately owned and operated domestic and commercial DEG devices while meeting the requirements of tightly regulated and legislated legacy electrical standards imposed on HV transmission operators. And because of the tightly controlled EPU output voltage, significant energy savings can also be realized.

The specific definition of point of use (POU) in this document is a single circuit point of connection between the end consumer and the LV grid. As such, a EPU can be installed at the end consumer POU, but not limited to directly at a switchboard in the end consumer's premises, electrical power connection service point, switch room, remotely at a single circuit connection to a single the end consumer's premises or load, in an adjacent location inside or outside of the end consumer's premises, or on an electric pole. A person ordinarily skilled in the art will view that a POU as defined in this document is where an EPU is installed, which can be between the end consumer's premises or load and the LV grid for a point-to-point connection, or any single circuit connection by a end consumer.

The specific definition of end consumer includes that of a conventional electrical power consumer on an energy grid and an owner and/or operator of a DEG device connected to an energy grid.

BRIEF DESCRIPTION OF THE DRAWINGS

Embodiments of the invention are described in more detail hereinafter with reference to the drawings, in which.

DETAILED DESCRIPTION

Figure 1:
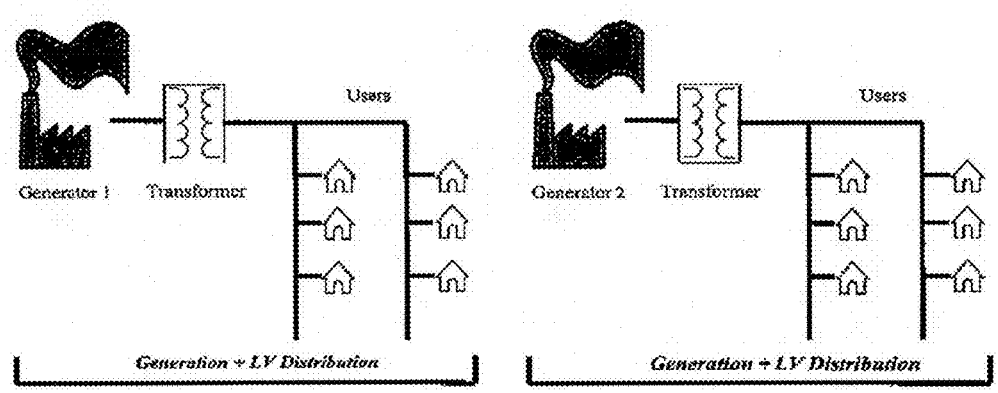
FIG. 1 depicts a logical diagram illustrating the electrical power generation and distribution networks during the late 1800's.
Figure 2:
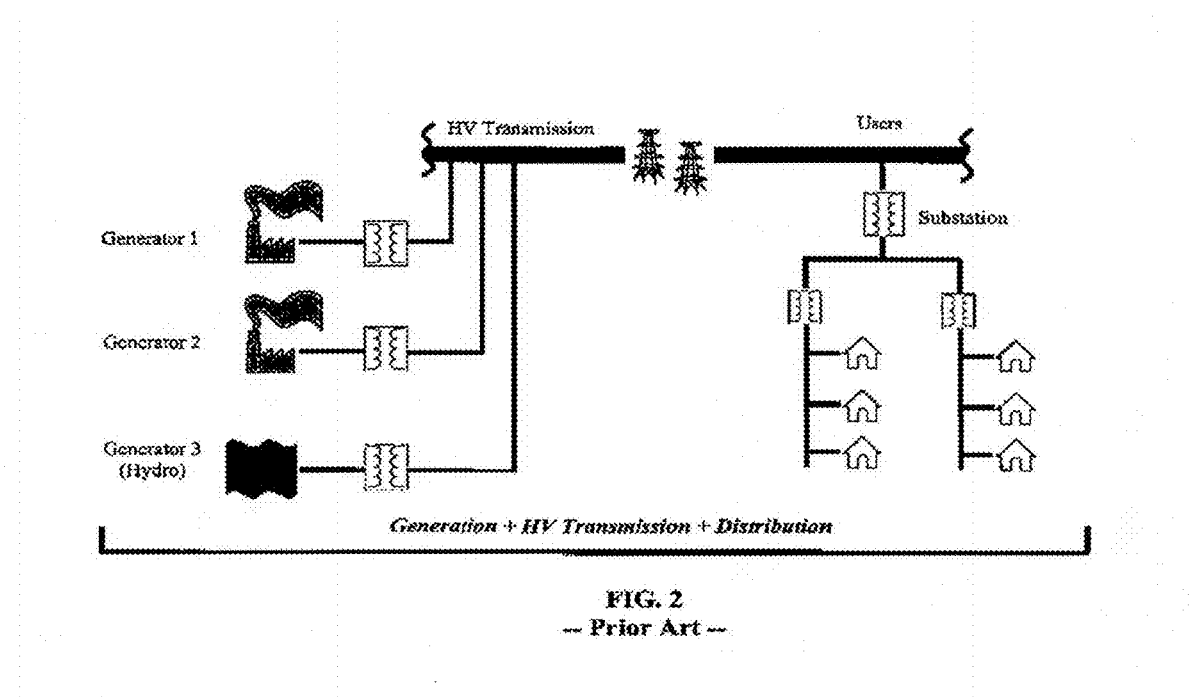
FIG. 2 depicts a logical diagram illustrating the electrical power generation and distribution networks during the 1900's.

In the following description, methods and systems of electrical power generation and distribution and the like are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

With the increasing negative impact to power quality of de-regulation that allows these privately owned and operated domestic and commercial DEG devices to be connected to the LV distribution networks, especially with the further legislation for FIT, and similar allowances in many countries, this is becoming a critical industry problem that is trying to be solved in adding complex digital communication networks and control algorithms to the power grids ("Smart Grid"). However, this approach is expensive, complex, and will take many years to knit the huge power system together, and in the meantime it will not improve the present situation that allows the connection of an increasing number of privately owned and operated domestic and commercial DEG devices to the distribution networks or solve the increasing addition of complex loads, and changing loads and power factors across the distribution networks. Finally, the electricity generation and distribution industry with its "Smart Grid" plans will in no way be able to deliver very close tolerance (<=1%) voltages to the customers' premises for maximum energy savings through load conservation voltage reduction (CVR) reduction, reduced reactive power KVAR absorption, and reduced KW peak demand customer billing.

The major concern expressed by many in the power industry is the stability of the overall power system as the increasing number of privately owned and operated domestic and commercial DEG devices are installed, that will degrade not only the local LV distribution networks, but also can threaten the HV Transmission Grids as more central Generating Utilities reduce capacity and spinning reserves due to the increasing energy being generated and loaded onto the LV distribution networks from the DEG devices, and the increasing renewable installations in general. With reduced central Generator Utilities spinning reserves, and more volatile energy being delivered to the LV distribution networks by the wide array and increasing numbers of privately owned and operated domestic and commercial DEG devices, the increasing chances of network voltage and Frequency tripping, and also the potential of major outages as HV grid faults cannot be rapidly compensated for with insufficient spinning reserves.

One aspect of the present invention is a power distribution system that completely bypasses the critical and increasing problem of the myriad and types of privately owned and operated domestic and commercial DEG devices being installed and connected mainly to the LV distribution networks that were not initially designed, or even anticipated, for the recent DEG evolution coupled with the increasing addition of complex loads, changing loads and power factors across the distribution networks, creating high and excessive energy wasting voltages, and higher KW peak demand usage.

In accordance to one aspect, the present invention transforms the tightly legislated and regulated legacy "electrical grid" into a sort of "open-source energy grid" with wide tolerance. In this "open-source" energy grid, an individual energy processing unity (EPU) device is installed at each end consumer's POU. These EPU devices are specifically designed to tolerant very wide ranges of voltage, current, and frequency variation—"dirty power" on the input, and processes the input "dirty power" to produce high quality "clear power" at the output delivered directly at the POU.

The EPU can be simply installed at each POU without any changes to the LV distribution networks, with no limit of the quality and number of DEG devices that can be installed and connected, hence the present invention allows the recent evolution to the "electric grid" to evolve to an "open-source energy grid" with the EPU processing the "dirty power" to generate "clear power" directly at the POU and the customers' premises.

For example, in one configuration in accordance to one embodiment of the present invention, the input to the EPU can be designed to accept voltage tolerance of +−25%, and deliver a voltage with an automatic voltage regulation (AVR) incorporated in the EPU, at its output, at POU of +−2%. Therefore, for example, the LV distribution network voltage tolerance can be relaxed to +−25%, transmission grid to +−10%, and also the DEG devices output Voltage to meet +−10%. So, with the EPU's installed, and the power quality tolerances widened to allow for distribution network and grid power quality volatility, and the EPU's delivering tightly regulated voltage (e.g. +−1% tolerance) at customers POU, the DEG revolution can continue with increased distribution and network stability and high level of power quality at POU, without limiting the numbers of DEG devices that can be connected to the LV distribution network.

Also with an EPU installed at the POU, and with the potential power quality problems of the increased volatility and stability of the distribution networks with the connection of increasing numbers of privately owned and operated domestic and commercial DEG devices, and with the EPU correcting wide voltage volatility and wide tolerances at the customer POU to very tight voltage regulated tolerances (e.g. +−1%), regardless of the wide power quality aberrations on the LV distribution network, especially voltage, PF, harmonics, and current unbalances, there are, in addition, additional advantages in significant energy savings as the output high power quality of the EPU at the POU are tightly controlled, hence significant power savings are also possible.

In another configuration in accordance to one embodiment of the present invention, since with the series voltage method, the output voltage of the EPU is regulated and held to tight nominal voltage and tolerance regardless and independent of the high distribution voltages at the input of the EPU, and also since the EPU is bidirectional, any excess energy connected to the output of the EPU is passed back to its input and onto the HV distribution network, regardless of the high voltages on the distribution network. However, when the DEG interface is connected to the EPU output, the DEG interface control electronics only sees and senses the normal and nominal regulated EPU output, hence the DEG interface electronics will continue to operate normally with full energy recovery, and never trigger over voltage lock out (OVLO) of the DEG device. As such, the EPU of the present invention solves the problem associated with the increasing number of DEG installations on the LV distribution networks.

Figure 4:
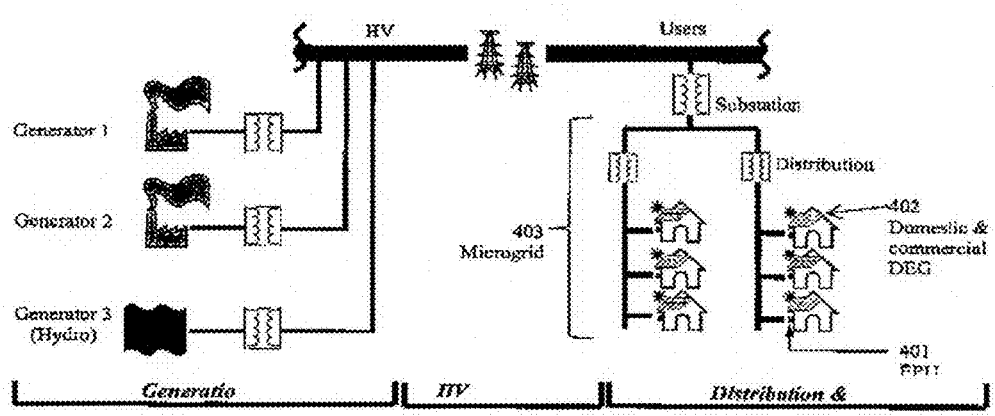
FIG. 4 depicts a logical diagram illustrating an electrical power generation and distribution network with DEG devices and EPU's in accordance to one embodiment of the present invention.

FIG. 4 shows the DEG 402 connection to the output of the EPU 401, which is also connected to the actual premises POU. Since the EPU 401 operates as a series voltage regulator, basically "isolating" the DEG interface from the high distribution voltages, the DEG interface and energy recovery operates normally as the DEG control electronics only sees or senses the fixed and set nominal EPU regulated output voltage, and any excess DEG energy is passed back through the bidirectional EPU to the EPU input connected to the distribution network regardless of the high voltages on the distribution network, allowing normal FIT for the user, and the DEG device only sees the tightly regulated output of the EPU hence the DEG device never turns off triggered into OVLO.

In another configuration in accordance to a preferred embodiment of the present invention, instead of a full AVR incorporated in the EPU, the EPU can be designed for maximum energy savings utilizing conservation voltage reduction (CVR), so the EPU can be configured with only a voltage decreasing AC voltage regulator in conjunction with a series bypass contactor for lower cost and additional energy savings under the condition of low voltage AC mains. So instead of the EPU utilizing a full AVR that will boost the voltage up to the set regulated output voltage but will lose the additional energy savings if just an EPU with a voltage decreasing AC voltage regulator is used in conjunction with a series bypass contactor. For example in this energy saving optimization configuration of the EPU, the present invention is related to optimizing energy savings of the EPU and also protecting the electrical loads from overvoltages and energy wasting high AC input voltages above an optimum energy savings level. In the case of the input mains AC voltage falling below a selected optimum level, as if a full AVR is utilized in the EPU, the full AVR not only continues to use its internal power electronics to boost the low input AC voltage to the set regulated output AC voltage, the AVR would increase or boost the input AC mains voltage to the set optimum output energy savings voltage level, then the energy savings would not be optimized under low input mains AC voltage, as the input current hence the input power would increase as the full AVR increases or boosts the low mains input AC voltage.

In this preferred embodiment of the present invention, if the input AC mains voltage drops below the optimum energy savings voltage or a lower selected voltage point, the voltage decreasing power electronics in the EPU are switched out to save the voltage decreasing AC voltage regulator internal power electronics usage, and the series bypass contactor is activated, so that the lower mains voltage is directly delivered to the electrical load, hence achieving even more energy savings than in the case if a full voltage increasing AVR is used in an alternate EPU configuration. The principles of the present invention are readily applicable to any poly-phase AC system, such as a single or 3-phase electrical system.

For example in worldwide electrical systems, the final LV distribution voltages are generally either 110/120 VAC systems, or 220/230/240 VAC systems, although most of the world is standardizing to nominal 120 VAC or 230 VAC systems for LV distribution voltages. Also there are standardized and legislated electrical system specifications, and especially distribution voltage levels and tolerances to be delivered to the switchboards of domestic and commercial premises. For example in the United States the standard distribution voltage for domestic and commercial premises is 120 VAC (specified by FERC/NERC), and voltage tolerances of maximum of +5%, and minimum of −5%. In the higher voltage 230 VAC systems such as Australia (specified by AS60038), and the UK (Specified by EN50160), the allowed voltages tolerances are specified as a maximum of +10%, and a minimum of −6%. Although it is accepted in the industry that overvoltage levels can be higher, and an overvoltage of +10%, and an undervoltage of −10% as extreme limits, but still acceptable. But these extreme and maximum voltages when applied to electronic equipment and appliances, especially electrical motors, that are designed to the nominal specified standard voltages such as 120 VAC in the United States and 230 VAC in Australia and UK, not only waste energy because of the additional higher working voltage, but also do not perform optimally, motors and transformers can overheat, shorten working life times, and can permanently damage any equipment connected to the electrical system.

So, say for the United States, the voltage range, from a nominal 120 VAC, for a maximum voltage of +5% is 126 VAC, and a +10% overvoltage level of 132 VAC, and a minimum of −5% is 114 VAC, with an undervoltage of −10% of 108 VAC. It is generally accepted in the industry that the transmission and distribution operators in the United States will deliver the minimum voltage of 114 VAC to the premises switchboard, and allowing another 3.5% voltage drop estimated for a minimum of 110 VAC to the actual loads, such as appliances in domestic premises.

To deliver the specified range of voltages within the allowed voltage tolerances from the nominal voltage of 120 VAC to say each domestic or commercial premises on a local power island distribution network, it requires a higher voltage at the input to the local power island distribution network, because of the voltage drop that takes place serially along the physical wires of the distribution network due to the electrical resistance of the wires and system conductors. So typically premises close to the sub-station of the distribution network local power island will see the higher maximum voltage ranges, and further along the local power island distribution network, the lower voltages in the range. So for the United States, the voltage range can be from 126 VAC or even higher, down to 114 VAC or even lower, for a nominal 120 VAC local power island distribution network.

Similarly for the nominal 230 VAC countries, such as Australia and the UK, the voltage range can be from 253 VAC or even higher at the local power island substation, down to 216 VAC or even lower along the distribution network, for a nominal 230 VAC local power island distribution network, allowing for up to 5% voltage drop across internal facility or residential wiring.

So there have been major investments made into the local power island distribution networks to minimize the tolerances of the delivered mains AC voltage to all domestic and commercial premises, but this has become more difficult due to the increasing usage and complex electronic loads being added into domestic and commercial premises coupled with changing loads and power factors. Hence only with the added EPU units at the POU can the real advantage be taken for maximum energy savings due to the closely regulated voltage with a narrow voltage tolerance on the EPU output directly at the customer POU. In the United States for example, there is now more electrical power being used by domestic and commercial premises that industrial usage. With the aforesaid problems associated with DEG, the problems compound dramatically in terms of power system complexity, voltage range volatility, and especially overvoltages.

Electrical and electronic equipment and appliances, especially electrical motors, are specifically design to operate at the nominal specified standard voltages, such as 120 VAC in the United States, and other 120 VAC countries, and 230 VAC in Australia, UK, and other 230 VAC countries. Voltage over the nominal design standard voltage not only can damage the connected electrical and electronic equipment, but they also consume more energy than is necessary, motors and transformers can overheat, hence there is an optimum voltage in general that optimizes the performance and delivers the maximum energy savings. So for example, in an EPU optimized for maximum energy savings utilizing CVR, the optimum energy savings voltage is selected to be the nominal mains voltage −5% to achieve normal equipment performance, and maximize energy savings. So that energy savings set voltage could be 114 VAC for nominal 120 VAC systems, and 220 VAC for nominal 230 VAC systems, or other lower energy saving voltages could be selected, and this is just an example to clearly show the concept. Also, the output voltage of the EPU could be set lower including the voltage drop allowed for in facility or residential wiring, from maximum 3% to 5% voltage drop depending upon the legislation country by country.

Therefore, in this preferred embodiment of the present invention, only a voltage decreasing AC voltage regulator is needed working in conjunction with a series bypass contactor, and the output voltage of the voltage decreasing AC voltage regulator is set at energy saving level of 114 VAC for nominal 120 VAC systems, and set at energy saving level of 220 VAC for 230 VAC systems, so under the conditions of extreme or overvoltages the voltage decreasing AC voltage regulator keeps the output voltage to the load at the selected set energy savings voltages. Under the conditions of the input AC mains voltage falling below the energy savings set voltage (in this example 114 VAC for nominal 120 VAC systems, and 220 VAC for nominal 230 VAC systems), if a full AVR is used, then the full AVR will not only be using internal power to increase or boost the low input mains AC voltage, but that will not save as much energy as the present invention, as below the set energy saving voltage, the control electronics will sense the low input AC mains voltage, switch off the voltage decreasing AC voltage regulator power electronics saving internal energy, and activate the series bypass contactor, hence the low main AC input voltage is now applied directly to the load, minimizing the voltage drop if the voltage decreasing AC voltage regulator stayed connected in the circuit, and additional energy savings is achieved by this low input mains AC voltage being applied directly to the load through the series bypass contactor. Also when the input mains AC voltage increases above the set energy savings voltage, the series bypass contactor is switched out, and the voltage decreasing AC voltage regulator is activated to regulate the output AC voltage to the load at the energy savings voltage level, regardless of the higher and extreme overvoltages on the distribution network.

In another embodiment of the present invention, a specific energy savings EPU with just the voltage decreasing AC voltage regulator working in conjunction with a series bypass contactor incorporates standard digital communications as designed in many "smart meters". This way, the energy savings EPU utilizing CVR could be called an "energy saving meter" as it not only performs and reports as a "smart meter" in communicating over the various standard modes of "smart meter" digital communication, but it also can save energy, and report accurate billing power data.

To illustrate the decreasing of the EPU output voltage to an optimum energy savings level, in the example say 114 VAC for a 120 VAC system, and say 220 VAC for a 230 VAC or 240 VAC system, savings of 10% to 15% can be achieved, and these savings will be increased under low voltage conditions below the 114 VAC in the 120 VAC system, or 220 VAC in the 230 VAC or 240 VAC systems in this lower cost energy savings EPU using just a voltage decreasing AC voltage regulator in conjunction with a series bypass contactor, instead of an EPU utilizing a full AVR. This invention is related to the ability to even set the EPU output voltage lower than the minimum legislated voltages, for example 114 VAC for nominal 120 VAC systems, and 220 VAC for nominal 230 VAC systems, by dynamically compensating for the internal wiring voltage drop across the facility or residential wiring.

The EPU can be designed to work in a bi-directional digital communication network, which can be used to communicate to a central location the status of the EPU devices and the LV distribution network. This transmitted data can be used to modify the operation of the EPU devices to alleviate LV distribution network problems, and also the EPU power island can be isolated to operate as a "micro grid" (403 in FIG. 4), in that local power area, and because of the relaxed power quality tolerances on the LV distribution network, the LV distribution network or micro grid can operate with much wider power quality volatility, while the EPU's process that "dirty power" to deliver "clean power" at the POU. Also the digital data can be used on much wider power island areas, to modify the overall interaction and operation of the generators, transmission grid, DEG's, and EPU's to maintain the stability of the power system, but with the wider power quality tolerances on the Power System, because of the installation of EPU's, it allows much easier overall system control with increased distribution power quality volatility, while the EPU's still deliver high power quality "clean power" at the POU.

There are two ways to regulate voltage on the AC mains. One is by series voltage regulation, where the AC input and AC output are "decoupled" with only the differential voltage between the unregulated input AC voltage and the specified and fixed regulated output AC voltage being processed by the power electronics. The other method is by shunt current regulation, where the AC voltage is changed by injecting a specified current in shunt or parallel with the mains, and adjusting the level of the specified current being injected or absorbed by the power electronics interfacing with an internal storage device, such as a high voltage electrolytic capacitor. The shunt current regulation method, therefore, controls the AC mains line voltage by driving or absorbing a specified current interfacing with an internal storage device across the mains line impedance or resistance.

The EPU voltage regulation in accordance to the embodiments of the present invention is by series voltage regulation methods including, but not limited to, the series AC high frequency voltage regulator techniques disclosed in U.S. Pat. No. 9,148,058, U.S. patent application Ser. No. 14/565,444, and PCT International Application No. PCT/CN2015/070538. The series voltage regulation methods have major advantages over the shunt current regulation method. The shunt current regulation method requires significant current to be generated to change the voltage differential under the conditions where the AC line impedance is very low. The AC line impedance is typically much less than 1 ohm, and in many cases can be less than 0.1 ohm, and is also changing depending on line conditions. Thus, the shunt current regulation method is inefficient and limited in its ability to drive sufficient current into the low line impedances to regulate the voltage over a wide range, and in some cases, with a very low line impedance cannot generate or absorb sufficient current to correct to the required voltage. The series voltage regulation method, as used in the present invention, is highly efficient, does not need an internal storage device such as an unreliable high voltage electrolytic capacitor necessary for the shunt configuration, and can regulate the AC output voltage over a very wide range of input AC voltages, is independent of line impedances, and can be operated independently as a standalone AC series voltage regulation AVR.

In one embodiment, the series voltage regulator in each of the energy processing units being a series alternate current high frequency voltage regulator defined in U.S. Pat. No. 9,148,058, U.S. patent application Ser. No. 14/565,444, or PCT International Application No. PCT/CN2015/070538. Various embodiments of the aforesaid series voltage regulators are further characterized by:

1.) the first and third independently controllable switches are driven by a first pulse width modulation (PWM) signal;

2.) the second and fourth independently controllable switches are driven by a second PWM signal;

3.) the first and third active rectifiers are controlled (if applicable) by a signal derived from the first PWM signal;

4.) the second and fourth active rectifiers are controlled (if applicable) by a signal derived from second PWM signal;

5.) wherein the first and second PWM signals are complementary with each other;

6.) wherein the first and second PWM signals are either non-overlapping with an adjustable dead time between the first and second PWM signals or overlapping with an adjustable overlap time between the first and second PWM signals;

7.) wherein the dead time and the overlap time can be dynamically adjusted based on output load level; and 8.) wherein the first and second PWM signals are controlled based on cycle-by-cycle average value feedback, or cycle-by-cycle RMS value feedback.

Figure 5A:
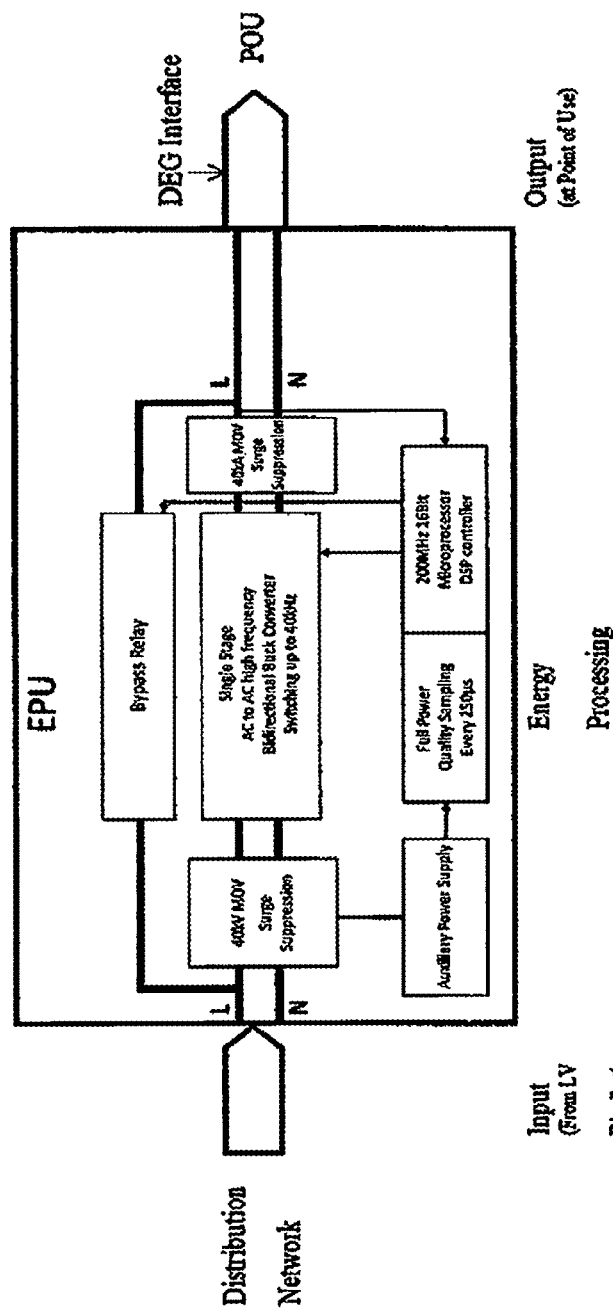
FIG. 5A depicts a block diagram illustrating a configuration of an energy processing unit in accordance to one embodiment of the present invention.
Figure 5B:
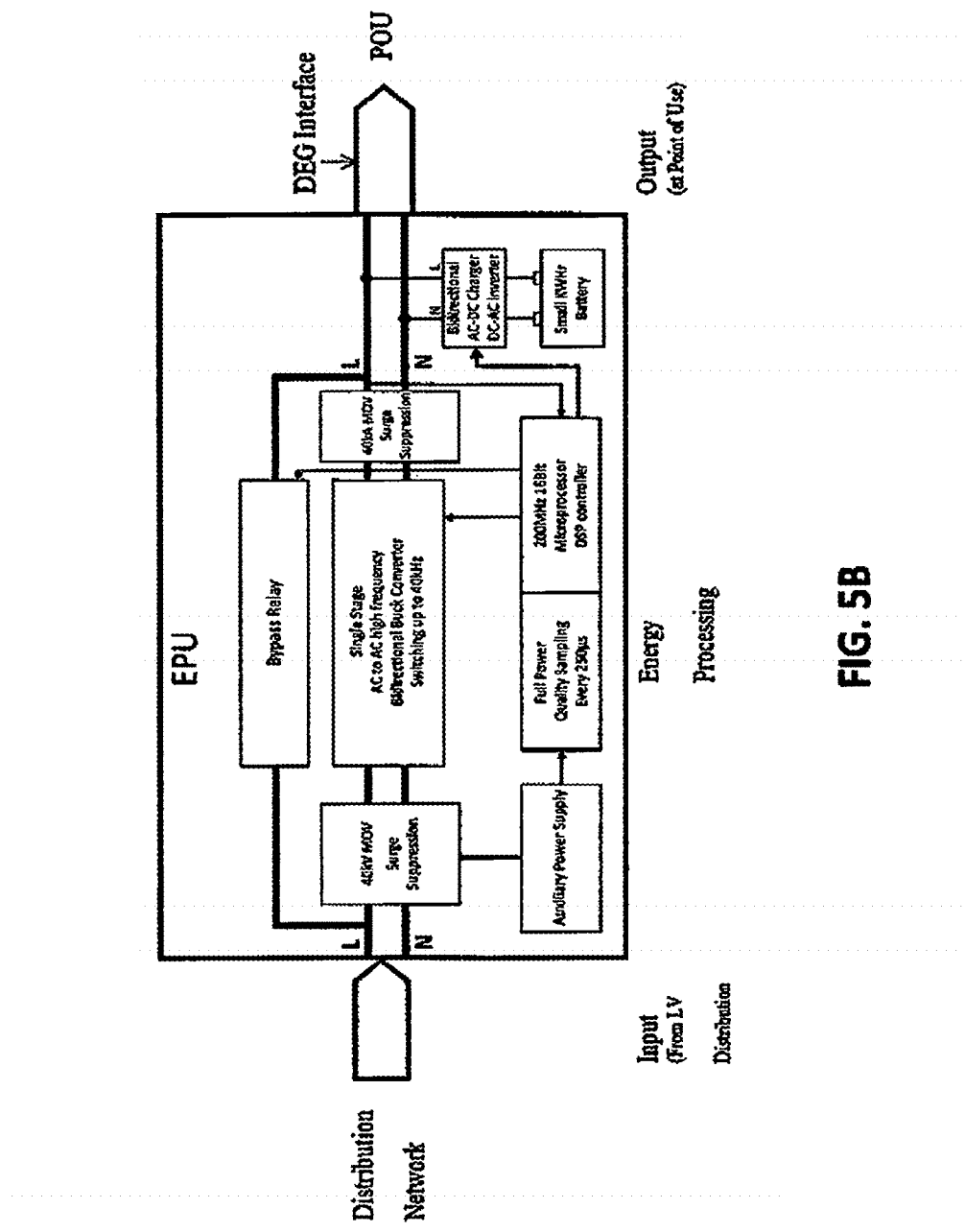
FIG. 5B depicts a block diagram illustrating another configuration of an energy processing unit with bidirectional AC-DC charger, DC-AC inverter being connected to a battery in accordance to one embodiment of the present invention.
Figure 6:
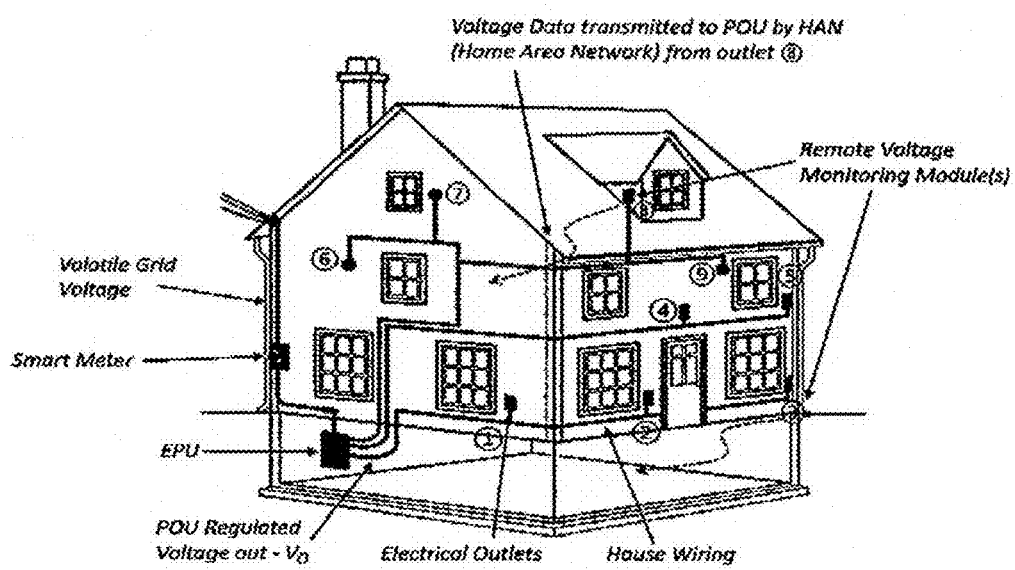
FIG. 6 depicts a logical diagram of an exemplary premises—a residential house, showing the electrical connections from the grid, smart meter, voltage regulating POU, house wiring, and electrical receptacles.

FIG. 5A shows the configuration of an EPU in accordance to one embodiment of the present invention and the following table lists its operating parameters in addressing the aforesaid power qualify problems. FIG. 5B shows another configuration of an energy processing unit with bidirectional AC-DC charger, DC-AC inverter being connected to a battery.

very tight controlled voltage tolerance, for example <1%, (which any other form of distribution voltage regulation cannot deliver such a tight tolerance voltage from the pole to the customer POU), it is possible to capture even more energy savings by dynamically controlling the voltage at the output of the EPU. Since there are legislated maximum voltage drops allowed across the internal wiring (e.g. maximum 3% in the U.S., and up to maximum 5% in Australia), if the voltage at the output of the EPU can be remotely set at the furthest one or more mains outlets in the facility or house (e.g. as shown in FIG. 6) by remote communication means (e.g. wireless module based on i.e. WiFi, Zigbee, LoRa, Sigfox, or any other suitable home area networking (HAN), power line communication (PLC), etc.), the voltage at one or more of the mains receptacle can transmit its voltage reading continuously, such that as the loads change in the house wiring, the output voltage of the EPU dynamically changes to allow the minimum voltage across the house wiring. For example, in the U.S., the remote mains receptacle voltage can now be set at say 110 VAC, lower, and the remote sensing and communication of that voltage changes the output of the EPU dynamically to maintain the voltage 110 VAC, or lower, at the mains receptacle for maximum energy savings.

In yet another embodiment, since energy savings due to the tightly regulated voltage at the output of the EPU delivered directly to the customer POU, and since the EPU can deliver, very tight controlled voltage tolerance, for example <1%, (which any other form of distribution voltage regulation cannot deliver such a tight tolerance voltage from the pole to the customer POU), it is possible to capture even more energy savings by dynamically controlling the voltage at the output of the EPU. Since there are legislated maximum voltage drops allowed across the internal wiring (e.g.

| Power Quality Problems | Input to EPU | Output to POU | Notes |
| --- | --- | --- | --- |
| 1) Rapid voltage change | V up to ±25% | V ±2% | Fast electronic control eliminates rapid voltage changes |
| 2) Low frequency voltage change | V up to ±25% | V ±2% | Eliminates low frequency voltage changes |
| 3) Under voltage dips | V drop to −25% | V ±2% | Eliminates under voltage dips |
| 4) Over voltage surges | V up to +25% | V ±2% | Eliminates voltage surges |
| 5) Over voltage spikes and noise | V up to ±25% Noise protected | V ±2% | Eliminates over voltage spikes and noise |
| 6) Voltage unbalance | V/phase ±10% | V/phase ±2% | Balance voltage unbalance |
| 7) Voltage harmonics | THD up to ±10% | THD ±3% | Elements major voltage harmonic |
| 8) Power factor | PF ≥0.98 | PF ≥0.5 load PF | Load PF corrected at input |
| 9) Current unbalance | I/phase ±10% | I/phase ±2% | Load current unbalance corrected at input |
| 10) Frequency deviation | F ±5% | F ±1% | Frequency derivation corrected |
| 11) DEG grid interface control electronics shutoff eliminating DEG energy recovery and FIT for the user | distribution network | Fixed nominal regulated voltage | EPU output voltage is regulated so the DEG grid interface operates normally and excess DEG energy flows bidirectionally back to the distribution network. |

Figure 7:
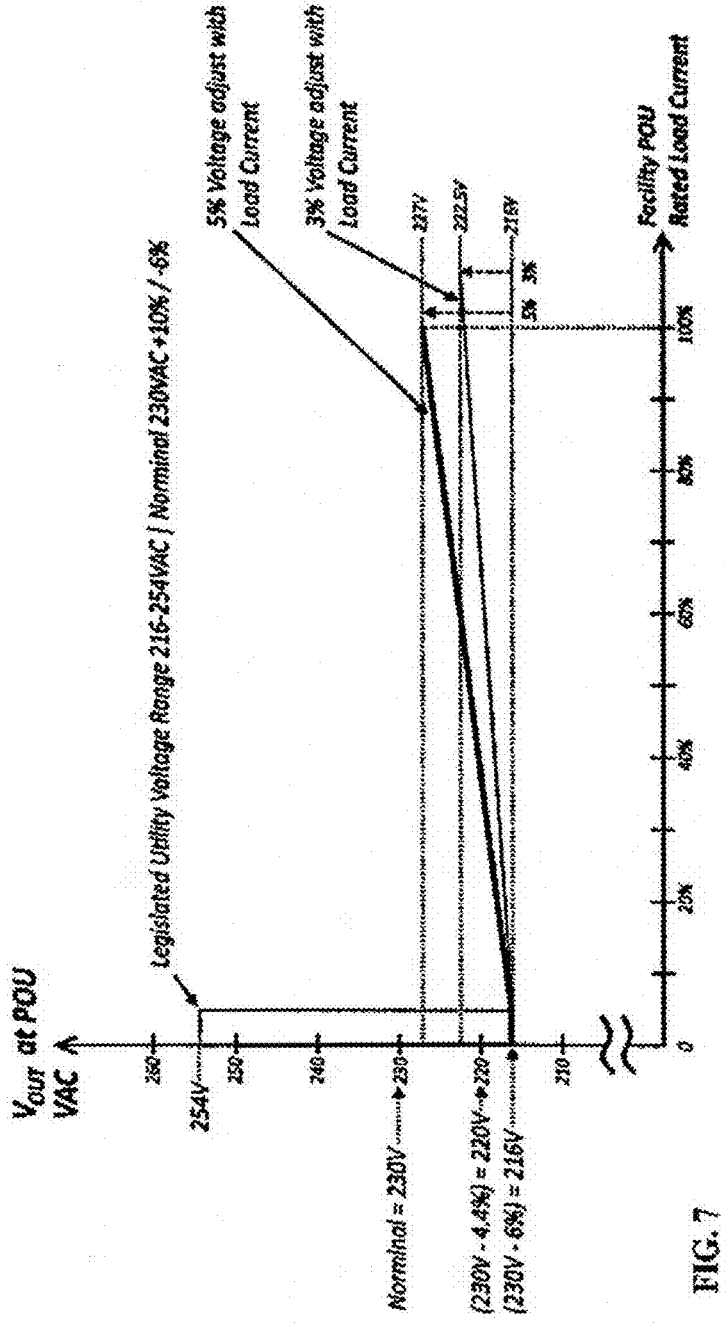
FIG. 7 depicts an exemplary graph showing voltages against POU and load current of the premises.

In another embodiment, since energy savings due to the tightly regulated voltage at the output of the EPU delivered directly to the customer POU, and since the EPU can deliver, maximum 3% in the U.S., and up to maximum 5% in Australia), in this preferred embodiment, referring to FIG. 7, the internal control system of the EPU detects the facility or residence load current, and as that will increase the voltage drop across the internal facility or residential wiring, as the current increases, the output of the EPU, increases also, to compensate for the increasing voltage drop within the facility. FIG. 7, as an example of a 230AC nominal voltage system, shows the linear (but could be any shaped) voltage change vs. load, the voltage adjustments of maximum 3% and 5% for full load. Anyone skilled in the art can use different voltages (linear or non-linear) vs. load, and tolerances without negating the core principle of this invention, which is an adaptive voltage control of the EPU at the customer POU using load current to not only control the output voltage of the EPU to compensate for internal wiring voltage drop, but also allow the output of the EPU to be set at even a lower voltage than the legislated minimum for additional energy savings and compensation for the falloff of efficiency of the EPU under low loads.

In yet another embodiment, since energy savings due to the tightly regulated voltage at the output of the EPU delivered directly to the customer POU, not only are energy savings created through the reduction of KW by the loads, through conservation voltage reduction (CVR) effect, and also reduced KVAR since reactive power is proportional to the applied voltage squared, but also the real power in KW peaks are reduced. Hence, the peak demands, that customers in some countries are now being billed as a peak demand tariff, are also reduced, with lower billings for customers, typically up to 7% reduction, depending upon the load, applications, and billing system. Further, in this embodiment, to reduce the peak demand even further, a small rechargeable battery is added, not for back up storage, but specifically designed only as small as possible and only enough capacity to only reduce further the peak demand and hence customer billing. For example in many applications, such as small houses or condominiums, a small rechargeable battery of less than 1 KWHr or 2 KWHr, so specifically not large enough for, and not aimed at, back up storage, but very limited in capacity, and only incorporated into the EPU, either internally or externally, to eliminate or significantly reduce the peak demand, to only reduce customer billing peak demand tariff.

In yet another embodiment, since energy savings due to the lower tightly regulated voltage at the output of each EPU delivered directly to the customer POU, not only energy savings are achieved through the reduction of KW by the loads, energy savings are also achieved through conservation voltage reduction (CVR) effect and reduced KVAR. Since reactive power is proportional to the applied voltage squared, the total apparent power KVA demand from the grid will be reduced due to the reduction in the load of real power consumption in KW and the reactive power in KVAR in the reduced output voltage of the EPU. Also, the reverse action can be accomplished by increasing the EPU tightly regulated voltage at the output of each EPU delivered directly to the customer POU. This way, not only is energy used by the load increases through the increase of KW by the loads through reverse of conservation voltage reduction (CVR) effect and also increased KVAR since reactive power is proportional to the applied voltage squared, the total apparent power KVA demand from the grid will increase due to the increase in the load of real power consumption in real power KW and the reactive power in KVAR in the increased output voltage of the EPU. Hence, by local or remote control over a digital communication and control system of the EPU output voltage, or preferably the control over more than one EPU as multiple EPU's in an array across or along a distribution network, changing the output voltages of these EPU's changes the total power demand in KVA from the grid, and in turn the grid voltage.

The grid voltage can be increased with lower EPU output voltages due to lower KW and KVAR or total KVA demand from the grid since lower power consumption by the load connected at the point of load output of each EPU, or the grid voltage can be decreased with higher EPU output voltages due to higher KW and KVAR or total KVA demand from the grid by the load connected at the point of load of the EPU outputs. Therefore, with an array of remotely controlled (via a digital communication network) EPU's across or along a distribution network, it is possible to control and change the grid voltage, due to the changing power demand from the grid, by changing the EPU's output voltages. Also with the real time high resolution and fine granularity of power quality data being monitored and transmitted to the SCADA, or the distribution control room, through a bidirectional digital communications network, from each EPU at each point of load, by adjusting the individual EPU output voltages across or along the network through the bidirectional digital communication network, it allows the grid voltage to also be finely adjusted, in real time, along the whole or even portions of the distribution network, that may include, but not limited to, all distribution networks and microgrids of all kinds and sizes.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

Figure 8:
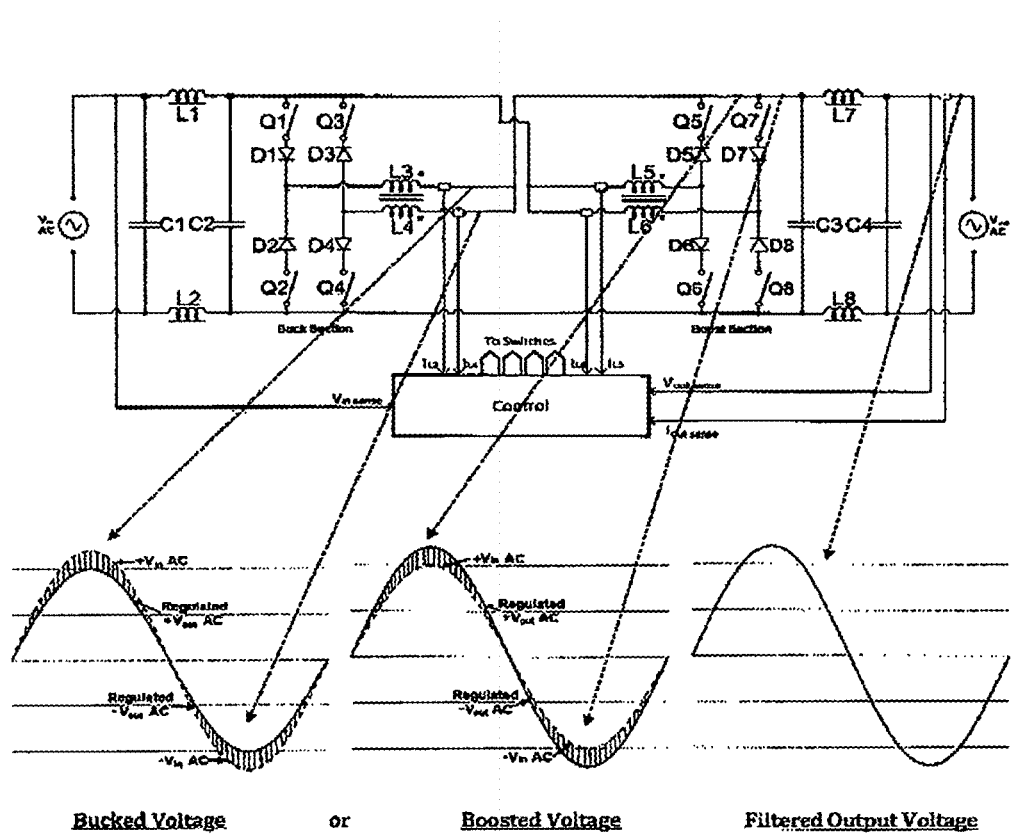
FIG. 8 depicts a circuit diagram of an embodiment of a high frequency (HF) AC series buck-boost voltage regulator in accordance to the series voltage regulator defined in U.S. patent application Ser. No. 14/511,187 and U.S. patent application Ser. No. 14/565,444.

Series Voltage Regulator defined in U.S. patent application Ser. No. 14/511,187 and U.S. patent application Ser. No. 14/565,444:

Referring to FIG. 8. Shown in FIG. 8 is a series voltage regulator topology. Instead of using unipolar switches connected as AC switches, the AC inductor current path in the buck and boost sections is split into two unipolar paths. In the buck section, the two unipolar paths are represented by two diodes connected as half-bridge branches, each responsible for the conduction of unipolar current. In the topology shown in FIG. 8, Q1/D1, Q2/D2, and L3 conducts current from left to right; and at the same time, Q3/D3, Q4/D4, and L4 conducts current from right to left. Inductor L3 and L4 are coupled inductors having identical number of turns for symmetry reason. The total output current, having the waveform of a typical buck converter is the sum of currents of L3 and L4 branches. The voltage regulation, again take the buck section as example, is controlled by conventional PWM method. The AC output voltage is linearly proportional to the duty cycle of the forward switches Q1/D1 and Q3/D3. The two distinct switching states are the same as those of a conventional buck converter: (1) Forward state: Q1/D1 and Q3/D3 switch on, Q2/D2 and Q4/D4 switch off; (2) Freewheel state: Q1/D1 and Q3/D3 switch off, Q2/D2 and Q4/D4 switch on. A small turn-on tuning overlay is provided during switching state transition from Forward to Freewheel and Freewheel to Forward to provide current continuity for the two inductor paths L3 and L4.

The AC output current is split into two unipolar paths as determined by the topology switch and diode directions. There is a small circulation current build-up in L3 and L4 paths, which is a small fraction of the full-load current and does not increase as the load current increases. The instantaneous ripple current direction reversal near output current zero-crossing is the sum of the circulation current ripple which is automatically handled by the topology. The amount of circulation current at specific operating voltage is a function of the PWM overlapping period and leakage inductance of the coupled inductors L3 and L4.

The AC current output current can be in any phase relationship relative to the input and output voltage. For this reason, this AC regulator topology is capable of operating in all four possible quadrants of the AC voltage and current cycle. The topology can handle any power factor and bi-directional power flow without the need of an intermediate DC link.

Due to the inherent unipolar nature of individual switching branches. The diode series connected half-bridge branches are shoot-through proof. This topology does not require accurate voltage and current polarity sensing to operate, the simple PWM relationship makes this topology very robust to power line voltage and current perturbation. The use of current sensing points along L3, L4, L5, and L6 are for protection and housekeeping purpose.

Figure 3:
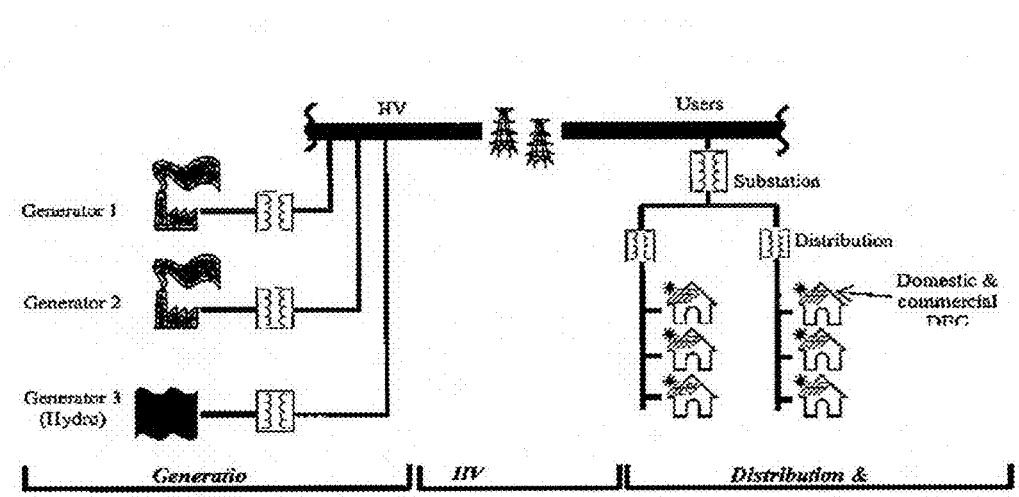
FIG. 3 depicts a logical diagram illustrating the present day electrical power generation and distribution networks with DEG devices but without the present invention.

This AC buck-boost voltage regulator employs lower loss unipolar switches in series with one rectifier. The power inductors, however, need to be treated separately. So in reference to FIG. 8, by making the unipolar semiconductor switching devices: Q1, Q2, Q3, Q4, Q5, Q6, Q7, and Q8 with series diodes: D1, D2, D3, D4, D5, D6, D7, and D8 respectively, the power inductors L3 and L4 in FIG. 3 can now be separated into power inductors L3 and L4 in the buck section, and L5 and L6 in the boost section as shown in FIG. 8.

For the input AC voltage, if, the AC voltage input level is above the desired set AC reference level in the electronic control circuitry, then the buck section will reduce the voltage at each 40 microsecond point (25 KHz frequency as an example) on the LF frequency mains AC input voltage, typically at 50 hz or 60 Hz, or other frequencies, with Q1 and D1, and Q2 and D2 with BF power inductor L3 processing the positive AC half cycle; and Q3 and D3, and Q4 and D4 with power inductor L4 processing the negative AC half cycle.

Similarly, if the AC voltage input level is below the desired set AC reference level in the electronic control circuitry, then the boost section will increase the voltage at each 40 microsecond point (25 KHz frequency as an example) on the LF frequency mains AC input voltage, typically at 50 Hz or 60 Hz, or other frequencies, with Q5 and D5, and Q6 and D6 with HF power inductor L5 processing the positive AC half cycle, and Q7 and D7; and Q8 and D8 with inductor L6 processing the negative AC half cycle.

With the positive and negative half cycles processed separately in the buck or boost input AC voltage processing, the positive and negative half cycles are processed independently. Hence, there is also no destructive shoot-through by any of the unipolar low loss semiconductor switches, as each semiconductor switch is now a single unipolar semiconductor device in series with only one rectifier. Furthermore, this unipolar switch topology is able to accept a wide coupling coefficient variation of the coupled inductor pairs L3/L4 and L5/L6, ranging from close to unity to zero (uncoupled). With this flexibility, one can either wound two windings on the same inductor core to save space or separate the coupled inductor pairs into two individual inductors to minimize circulating current.

The series voltage regulator defined in U.S. patent application Ser. No. 14/511,187 and U.S. patent application Ser. No. 14/565,444 has a number of advantages: a very robust buck-boost HF AC voltage regulator as there is no possibility of shoot-through, minimum and non-critical switching overlap timing for reducing peak currents, and the use of low loss unipolar semiconductor switches in series with one rectifier that reduces losses compared to a traditional single AC semiconductor switch. The analogue control circuitry, or preferably digital electronic control circuitry using DSP or microprocessor, is configured to handle all of the voltage sensing and control of the semiconductor switch timing. Since the destructive possibility of the semiconductor devices shoot-though is eliminated, the control circuitry is easier to implement with non-critical reference switch overlap timing. Therefore, the series voltage regulator defined in U.S. patent application Ser. No. 14/511,187 and U.S. patent application Ser. No. 14/565,444 presents a very robust improved HF AC voltage regulator.

The circuitries described above are simplified for demonstrating the basic principles of the series voltage regulator defined in U.S. patent application Ser. No. 14/511,187 and U.S. patent application Ser. No. 14/565,444, which utilizes unipolar semiconductor switches in series with one rectifier, and that the positive and negative cycles of the input AC voltage are processed separately with its own power inductor, either in a buck configuration for voltage decreasing, or boost configuration for a AC voltage increase. It should be obvious to any ordinarily skilled person in the art to be able to substitute the unipolar semiconductor switches in series with one rectifier, as shown in FIG. 8, with the one rectifier being an active rectifier, such as IGBT, FET, SCR, GTO's, or any of such devices in any configuration to achieve the same unipolar switching performance. Some configurations of the unipolar switching devices can be changed to facilitate the drive connections from the electronic control circuitry.

For example in FIG. 8, in reference to the unipolar semiconductor switching devices Q1 and Q2 each coupled with series rectifiers D1 and D2, the two unipolar switching semiconductor devices Q1 and Q2 can be connected to a common point at power inductor L3, with rectifiers D1 and D2 connected to the line, and ground, respectively. This or other similar configurations can be applied to each of the switching elements, but basically achieving the same effect, which is that of a unipolar switching semiconductor device in series with a rectifier. Additional rectifiers in series can be used, though the losses can be higher. Also, the buck AC voltage regulator section as shown in FIG. 8 can be used as a standalone series AC buck voltage regulator, and the boost AC voltage regulator as shown in FIG. 8 can be used as a standalone series AC boost voltage regulator.

Figure 9:
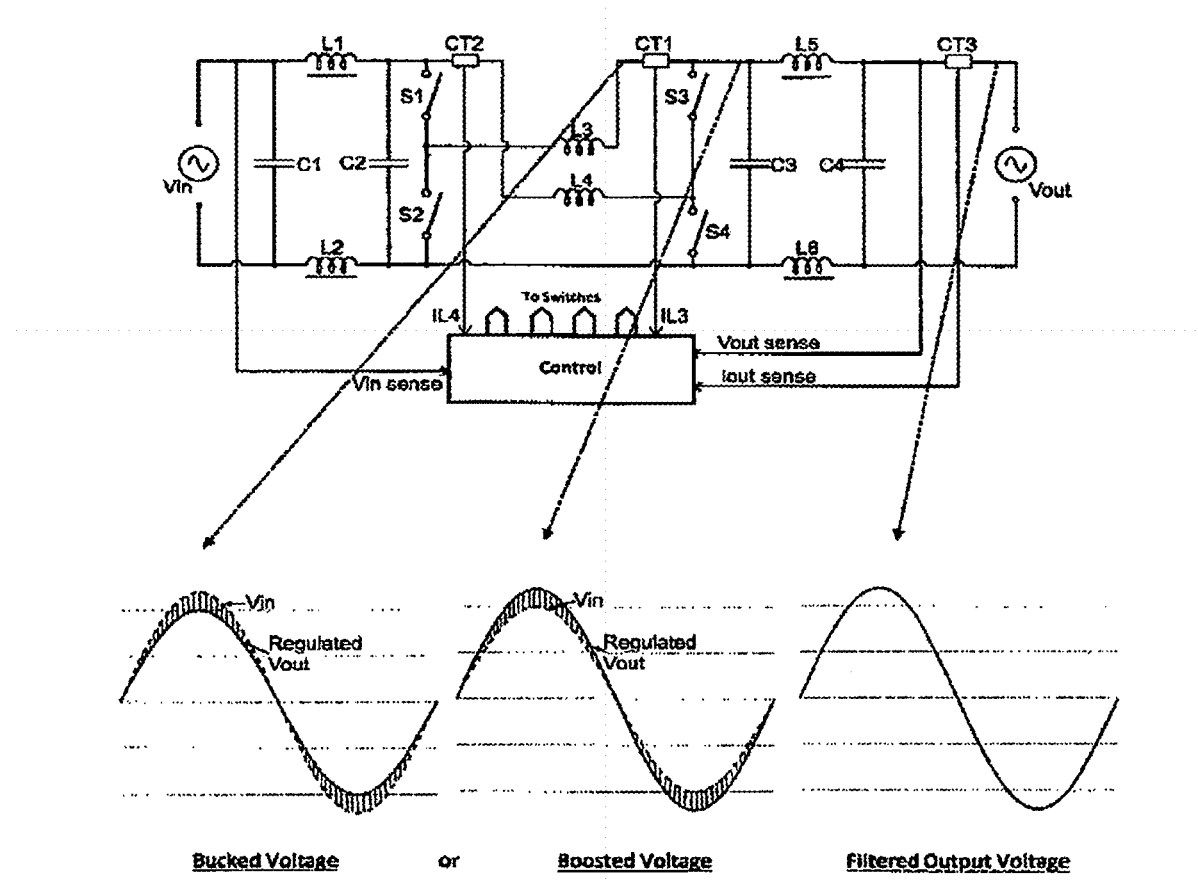
FIG. 9 depicts a circuit diagram of another embodiment of a high frequency (HF) AC series buck-boost voltage regulator in accordance to the series voltage regulator defined in U.S. patent application Ser. No. 14/511,187 and U.S. patent application Ser. No. 14/565,444.

FIG. 9 shows the basic operating principles of the series voltage regulator defined in U.S. patent application Ser. No. 14/511,187 and U.S. patent application Ser. No. 14/565,444 as a complete full AVR HF AC series voltage regulator that can buck or boost the AC input voltage at each HF point. For example, if the operating frequency of the AVR HF AC voltage regulator is configured to be 25 kHz, then the input voltage is sensed by the electronic analogue or mix of digital and analogue circuitry and compared to a voltage reference, and then the AC bidirectional semiconductor switches S1, S2, S3, and S4 in combination with the power inductors L3 and L4 are driven under PWM control to buck (reduce) or boost (increase) the AC input voltage at the AVR HF AC series voltage regulator output. The voltage is adjusted at each 40 microsecond interval point through each LF mains voltage cycle, typically, but not limited to, 50 Hz or 60 Hz. Therefore, under an analogue or digital electronic PWM control with reference to a fixed reference voltage level, the full AVR HF AC series voltage regulator is able to fully regulate the AC output voltage to the desired level.

FIG. 9 also shows the waveforms of the HF PWM bucking or boosting the input AC voltage at the AVR HF AC series voltage regulator output, and the input filter components C1, C2, L1, and L2 in combination are used to eliminate the HF switching energy from passing back into the input AC source; and the output filter components C3, C4, L5, and L6 in combination are used to eliminate the output HF PWM switching pulses and to average the HF voltage PWM ripple to an average DC level, creating a smooth regulated AC output voltage.

The circuitries and description thereof disclosed herein are simplified for clarity and various other circuit configurations and devices can be used in applying the principles of the series voltage regulator defined in U.S. patent application Ser. No. 14/511,187 and U.S. patent application Ser. No. 14/565,444. For instance, the bidirectional AC switches are semiconductor devices and can comprise of various circuit configurations, but these switches are still acting as AC bidirectional semiconductor switches as used commonly in the industry. Such Bidirectional AC semiconductor switches, for example, but not limited to, can be a rectifier bridge comprising of four rectifiers with a unipolar semiconductor device configuration inserted in the bridge such as SCR, GTO, IGBT, MOSFET, or any other semiconductor device used for the same effect with PWM drive control that can create a controlled bidirectional AC semiconductor switch device. Also, other semiconductor AC switch configurations and devices used in the industry with or without rectifiers such as back-to-back or anti-parallel-SCR's, GTO, IGBT, RB-IGBT, MOSFET, any other back-to-back or anti-parallel bidirectional AC semiconductor devices or configurations, or any other similar new semiconductor devices in the future, such as, but not limited to, GaN, SiC arc some of the alternative embodiments of the series voltage regulator defined in U.S. patent application Ser. No. 14/511,187 and U.S. patent application Ser. No. 14/565,444.

Although only single phase electrical systems are described herein, the principles of the series voltage regulator defined in U.S. patent application Ser. No. 14/511,187 and U.S. patent application Ser. No. 14/565,444 can be applied to other AC frequency and poly-phase AC systems, for example, common 3-phase electrical systems, by utilizing and interconnecting a number of the HF AC series buck topology, HF series boost topology, or combined AVR HF series buck-boost topology for full HF AC AVR automatic voltage control sections or units to create poly-phase voltage regulators. Since these HF series voltage sections can be independently controlled, they can also be designed for voltage balancing configurations to rebalance out of balance poly-phase voltages.

The AVR HF buck-boost AC series voltage regulator shown in FIG. 9 utilizes the HF (e.g. 1 KHz-1,000 KHz) power inductor L3 in combination with the AC bidirectional semiconductor switches S1 and S2 to bucks the AC input voltage, and HF power inductor L4 in combination with the AC bidirectional semiconductor switches S3 and S4 to boosts the AC input voltage. The AC bidirectional semiconductor switches, S1, S2, S3, and S4, arc driven individually by PWM outputs from the electronic control circuit to create an AVR automatic voltage control topology that can decrease (buck) or increase (boost) the input AC voltage to regulate the AC output voltage to a set desired level. This design is power-flow bidirectional, direct single stage, and has no internal DC link capacitor, which is typically an unreliable electrolytic capacitor.

In other embodiments, the buck topology and the boost topology can operate separately. Along with the combined AVR HF buck-boost AC series voltage regulator topology shown in FIG. 9, anyone of these topologies needs only to process a portion of the total output power depending on the level of AC input voltage range and variation.

At each HF PWM interval, for example 40 microsecond PWM intervals at 25 kHz, the input voltage in bucked (reduced) or boosted (increased) under HF switch PWM control that generates the correct PWM drive signal to the bidirectional AC semiconductor switches at each HF point on the mains low frequency, typically 50 or 60 Hz, to buck or boost and correct the output AC voltage level to a desired set output AC voltage reference fed to the control electronics.

Other embodiments include various filter configurations that can create the desired effect as described above, with an input filter configuration to eliminate the high frequency switching pulses from entering the input AC mains source, and an output filter configuration eliminating the high frequency switching pulses from the output AC voltage. Still other embodiments include an AC output voltage feedback loop and control electronics to regulate the output voltage to meet the AC output voltage specification of a root-mean-square (RMS), the preferred embodiment, an average voltage, or peak voltage levels of the AC output voltage.

Also, the AVR I-IF AC series buck-boost AC voltage regulator, and the independent buck or boost sections if used separately, only have to process the differential power across the buck and boost inductors, L3 and L4 respectively, to regulate the varying input AC voltage to a fixed and regulated output AC voltage; thus, this is much less power than the total output power because of the configuration. The buck and boost inductors, L3 and L4 respectively only have to handle the proportion of the total output power required to adjust the differential input AC voltages to regulate the output AC voltage to the desired set level.

Figure 10:
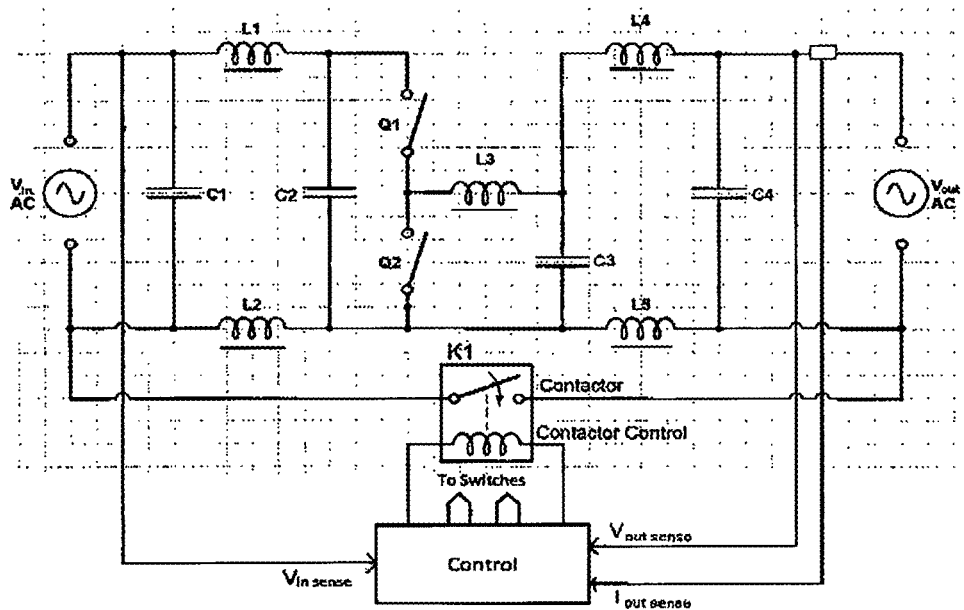
FIG. 10 depicts a circuit diagram of an embodiment of a high frequency (HF) AC series buck-boost voltage regulator in accordance to the series voltage regulator defined in U.S. patent application Ser. No. 14/511,187.

FIG. 10 shows a configuration of a TM Series AC Buck Voltage Regulator as described fully in U.S. patent application Ser. No. 14/511,187. It is a HF Series AC Buck Voltage Regulator with the unidirectional switching devices, comprising bidirectional AC switches Q1 and Q2, and a high frequency filter AC capacitor C4. In addition high frequency (HF) filter components are added to suppress and filter the HF (1 Khz 1,000 Khz) switching frequency on the input and output. Filter inductors L1 and L2 with filter bypass capacitors C1 and C2 on the input, and filter inductors L4 and L5 with filter bypass capacitors C3 and C4 on the output. Capacitors C2 and C3 could be optional depending on the components used and operating frequency. In FIG. 10 inductor L3 is a power inductor that is designed to operate at HF (1 Khz to 1,000 Khz). Since AC switching devices Q1 and Q2 are switching at HF (1 KHz to 1000 KHz) under electronic control either through analogue circuitry, but typically digital control circuitry with DSP or microprocessor signal processing, and the outputs from the control electronics drive the AC semiconductor devices with HF (1 KHz to 1000 KHz) modulated PWM modulation, and at each HF point along the LF mains AC voltage input, typically 50 Hz or 60 Hz, the control electronics generates a specific pulse of width enough to drive AC switches Q1 and Q2 to generate a negative differential voltage in combination with power inductor L3, hence bucking and regulating the output voltage at each point along the input AC voltage to the desired value set by the internal control reference.

For example, if the control is switching at a design frequency of 25,000 Hz, then every 40 microseconds the amplitude of the input mains LF voltage, typically 50 Hz or 60 Hz is bucked and decreased at that point, against the set internal voltage reference, so every 40 microseconds the circuit bucks the input AC voltage to adjust and regulate the desired set output AC voltage. The input filter consisting of capacitors C1, C2, and filter inductors L1, L2, and output filter consisting of capacitors C3, C4, and filter inductors L4, L5 or various combinations of HF filter elements can be used to filter and bypass the HF switching frequencies of the AC bidirectional semiconductor switches, switching at HF, such as in this example, at 25,000 Hz.

It is to be noted, for anyone skilled in the art, the circuits and description of the series voltage regulator defined in U.S. patent application Ser. No. 14/511,187 are simplified and various other circuit configurations and devices can be used, but the basic principles of this series voltage regulator are very clear in this application. For instance the bidirectional AC switches are semiconductor devices and can consist of various circuit configurations, but these switches are still acting as AC bidirectional semiconductor switches as used commonly in the industry. Such bidirectional AC switches can be traditionally a rectifier bridge consist of 4 rectifiers with a unipolar semiconductor device configuration inserted in the bridge such as SCR, GTO, IGBT or MOS PET, or any other semiconductor device used for the same effect with drive control that can create a controlled bidirectional AC semiconductor switch device. Also other semiconductor AC switch configurations and devices used in the industry such as back to back SCR's, GTO, IGBT, MOS FET or any other back to back bidirectional AC devices, or any other similar devices arc obviously covered in this patent application.

Also this HF Buck AC Voltage Regulator utilizes HF power inductor (1 KHz-1,000 KHz) L3 in FIG. 10, in combination with AC bidirectional semiconductor switches Q1, Q2 in FIG. 10, that are driven by an electronic control circuit to create a unique topology that can decrease the input AC voltage to regulate the AC output voltage to a set desired optimum energy saving level that saves energy as with a higher AC voltage level above this optimum level, then electrical loads such as Appliances, Electronic devices, Electronic Equipment, and especially Electrical Motors is inefficient and wasteful of energy. So at each HF PWM interval (for example 40 microsecond PWM intervals at 25 KHz) the input voltage in bucked (reduced) under HF switch control that generates the correct PWM drive signal to the AC switches at each HF point on the mains low frequency, typically 50 or 60 Hz, to buck and reduce the input AC voltage level, against a desired optimum set energy saving output AC voltage in the control electronics. Also anyone skilled in the art can arrange various filter configurations that still create the desired effect as described clearly in this patent, with the input filter configuration filtering out the high frequency switching pulses from entering the input AC mains connection, and the output filter configuration filtering the high frequency switching pulses from the output AC voltage, and remove such high frequency switch energies from the AC voltage at the input or AC voltage at the output.

Also, this HF Series Buck AC Voltage Regulator only has to process the differential power across the buck inductor (see FIG. 10, power inductor L3) to decrease the input to output AC voltage, so this is much less power than the total output power because of the configuration. The Buck inductor only has to handle the power required to adjust the differential input AC voltage to reduce the output AC voltage to the desired optimum energy savings set level. In addition, in the case of the mains AC input Voltage falling below the optimum energy savings set level, the control electronics senses the input AC mains voltage, and then disengages the series buck AC Voltage Regulator power electronics, and switches in the bypass contactor K1, in FIG. 10.

Figure 11:
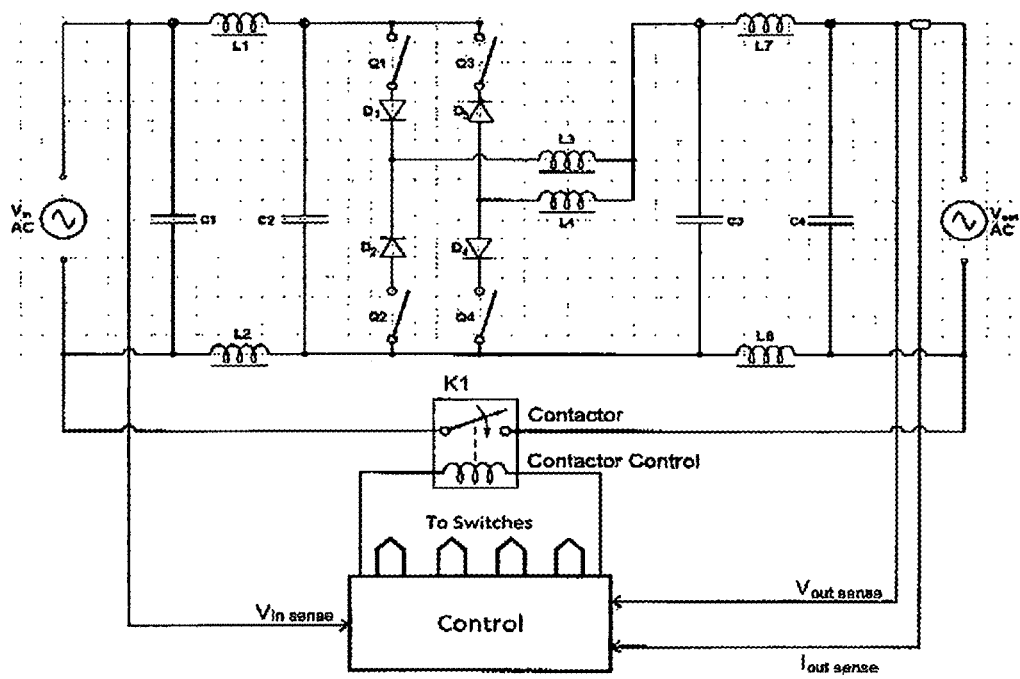
FIG. 11 depicts a circuit diagram of another embodiment of a high frequency (HF) AC series buck-boost voltage regulator in accordance to the series voltage regulator defined in U.S. patent application Ser. No. 14/511,187.
Figure 12:
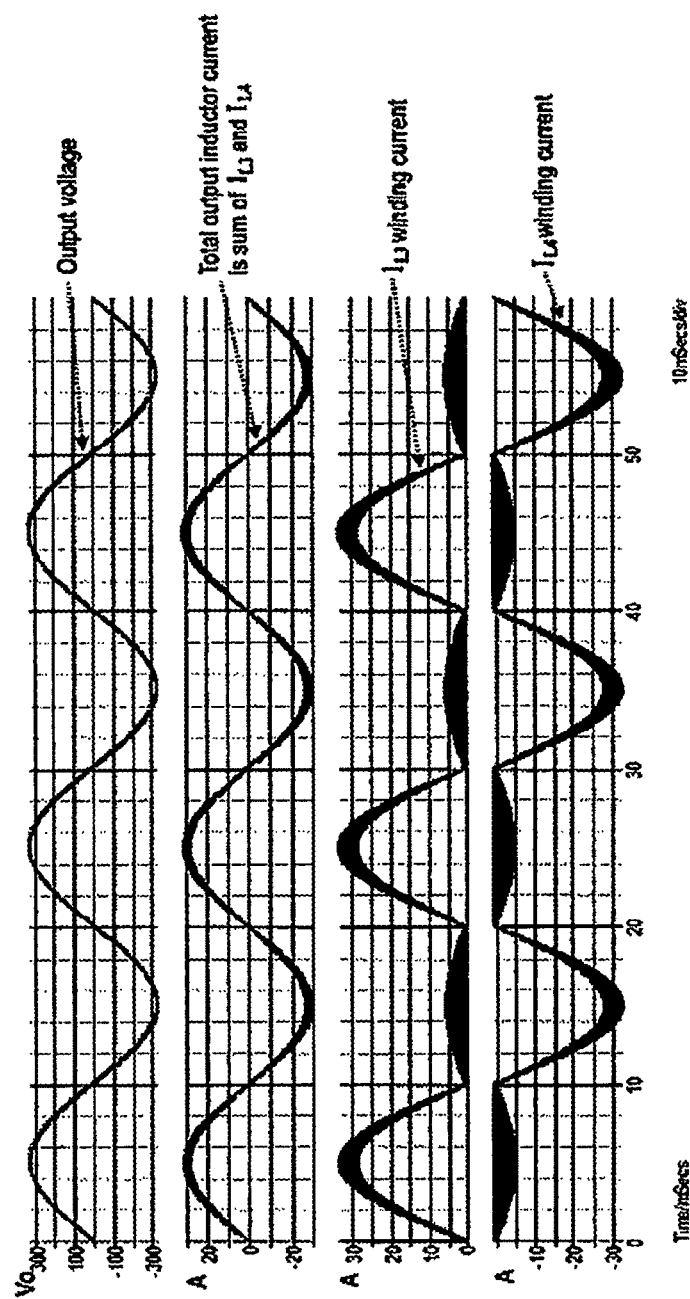
FIG. 12 shows the waveforms of the output voltage and current, the buck and boost winding currents of an exemplary embodiment (PWM 40 KHz, Vin=270 VAC RMS, Vout=232 VAC RMS, 50 Hz, Load=11.25 Ohm) of an improved HF AC series buck-boost voltage regulator defined in U.S. patent application Ser. No. 14/565,444.

FIG. 11 shows another configuration of an Improved HF Series AC Buck Voltage Regulator as described fully in U.S. patent application Ser. No. 14/511,187. Again for anyone skilled in the art, the Series AC Buck Voltage Regulator as described fully in U.S. patent application Ser. No. 14/511,187, again shown in FIG. 11 of this Application, can also be used instead of the HP Series AC Buck Voltage Regulator as shown in FIG. 10 of this Application, and everything shown in this series voltage regulator defined in U.S. patent application Ser. No. 14/511,187 also applies to either the HF Series AC Buck Voltage Regulator shown in FIG. 10, or the Improved HF Series AC Buck Regulator of FIG. 11, both shown clearly combined with the series bypass contactor K1, in both FIG. 10 and FIG. 11.

So this series voltage regulator is related to optimizing energy savings and also protecting the electrical loads from energy wasting high AC input voltages above an optimum energy savings level, and also in the case of the input mains AC voltage falling below a selected optimum level, as if a full AVR is used, the full AVR not only continues to use its internal power electronics to boost the low input AC voltage to the set regulated output AC voltage, the AVR would increase or Boost the input AC mains voltage to the set optimum output energy savings voltage level, then the energy savings would not be optimized under low input mains AC voltage, as the input current hence the input power would increase as the full AVR increases or boosts the low mains input AC Voltage. So in this series voltage regulator defined in U.S. patent application Ser. No. 14/511,187, if the input AC mains voltage drops below the optimum energy savings voltage or a lower selected voltage point, then the HF Series Buck AC Voltage Regulator power electronics are switched out to save the Buck regulator internal power electronics usage, and the series bypass contactor (K1 in FIG. 10) is activated, so that the lower mains voltage is directly delivered to the electrical load, hence achieving even more energy savings, than in the case if a full voltage increasing AVR is used. Also, the figures show only single phase versions, and anyone skilled in the art can apply these principles clearly to any polyphase AC systems, such as 3-phase electrical systems.

For example in worldwide electrical systems, the final low voltage Distribution voltages are generally either 110/120 VAC systems, or 220/230/240 VAC systems, although most of the world is standardizing to nominal 120 VAC or 230 VAC systems for low voltage Distribution voltages. Also there are standardized and legislated electrical system specifications, and especially Distribution voltage levels and tolerances to be delivered to the switchboards of Domestic and Commercial premises. For example in the USA the standard Distribution voltage for Domestic and Commercial premises is 120 VAC (specified by FERC/NERC), and voltage tolerances of maximum of +5%, and minimum of −5%. In the higher voltage 230 VAC systems such as Australia (specified by AS60038), and the UK (Specified by EN50160), the allowed voltages tolerances are specified as a maximum of +10%, and a minimum of −6%. Although it is accepted in the industry that overvoltage levels can be higher, and an overvoltage of +10%, and an undervoltage of −10% as extreme limits, but still acceptable. But these extreme and maximum voltages when applied to electronic equipment and appliances, especially electrical motors, that are designed to the nominal specified standard voltages such as 120 VAC in the USA and 230 VAC in Australia and UK, not only waste energy because of the additional higher working voltage, but also do not perform optimally, motors and transformers can overheat, shorten working life times, and can permanently damage any equipment connected to the electrical system.

So, say for the USA, the voltage range, from a nominal 120 VAC, for a maximum voltage of +5% is 126 VAC, and a +10% overvoltage level of 132 VAC, and a minimum of −5% is 114 VAC, with an undervoltage of −10% of 108 VAC. It is generally accepted in the industry that the Transmission and Distribution operators in the USA will deliver the minimum voltage of 114 VAC to the premises switchboard, and allowing another 3.5% voltage drop estimated for a minimum of 110 VAC to the actual loads, such as appliances in Domestic premises.

So to deliver the specified range of voltages within the allowed voltage tolerances from the nominal voltage of 120 VAC to say each Domestic or Commercial premises on a local power island Distribution network, it requires a higher voltage at the input to the local power island Distribution network, because of the voltage drop that takes place serially along the physical wires of the Distribution network due to the electrical resistance of the wires and system conductors. So typically premises close to the sub-station of the Distribution network local power island will see the higher maximum voltage ranges, and further along the local power island Distribution network, the lower voltages in the range. So for the USA, the voltage range can be from 126 VAC or even higher, down to 114 VAC or even lower, for a nominal 120 VAC local power island Distribution network.

Similarly for the nominal 230 VAC countries, such as Australia and the UK, the voltage range can be from 253 VAC or even higher at the local power island substation, down to 216 VAC or even lower along the Distribution network, for a nominal 230 VAC local power island Distribution network.

So there have been major investments made into the local power island Distribution networks to minimize the tolerances of the delivered mains AC voltage to all Domestic and Commercial premises, but this has become more difficult due to the increasing usage and complex electronic loads being added into Domestic and Commercial premises. In the USA for example, there is now more electrical power being used by Domestic and Commercial premises that Industrial usage.

Then with the recent disruptive advent of private Domestic and Commercial DEG (Distributed Energy Generation), couple with legislated FIT (Feed In Tariff) in many countries, where any private Domestic or Commercial premises owner can purchase and install and generate their own electrical power, and for example in the case of Domestic PV (Photovoltaic) installations, that power is impressed back onto the local power island Distribution network, adding dramatically to the power system complexity and voltage range volatility, and especially overvoltages.

Electrical and Electronic equipment and appliances, especially electrical motors, are specifically design to operate at the nominal specified standard voltages, such as 120 VAC in the USA, and other 120 VAC countries, and 230 VAC in Australia, UK, and other 230 VAC countries. Voltage over the nominal design standard voltage not only can damage the connected Electrical and Electronic equipment, but the they also consume more energy than is necessary, motors and transformers can overheat, hence there is an optimum voltage in general that optimizes the performance and delivers the maximum energy savings.

So for example, the optimum energy savings voltage is selected to be the nominal mains voltage −5% to achieve normal equipment performance, and maximize energy savings. So that energy savings set voltage could be 114 VAC for nominal 120 VAC systems, and 220 VAC for nominal 230 VAC systems, or other lower energy saving voltages could be selected, and this is just an example to clearly show the concept. So in this series voltage regulator defined in U.S. patent application Ser. No. 14/511,187 only the HF Series Buck AC Voltage Regulator needed working in conjunction with a series bypass contactor, and the output voltage of the HF Series is set at energy saving level of 114 VAC for nominal 120 VAC systems, and set at energy saving level of 220 VAC for 230 VAC systems, so under the conditions of extreme or overvoltages the HF Series Buck AC Voltage Regulator keeps the output voltage to the load at the selected set energy savings voltages. Under the conditions of the input AC mains voltage falling below the energy savings set voltage (in this example 114 VAC for nominal 120 VAC systems, and 220 VAC for nominal 230 VAC systems), if a full AVR is used, then the full AVR will not only be using internal power to increase or boost the low input mains AC voltage, but that will not save as much energy as this series voltage regulator defined in U.S. patent application Ser. No. 14/511,187, as below the set energy saving voltage, the control electronics will sense the low input AC mains voltage, switch off the HF Series Buck AC Voltage Regulator power electronics saving internal energy, and activate the series bypass contactor, hence the low main AC input voltage is now applied directly to the load, minimizing the voltage drop if the HF Series Buck AC Voltage Regulator stayed connected in the circuit, and additional energy savings is achieved by this low input mains AC voltage being applied directly to the load through the series bypass contactor (K1 in FIG. 10). Also when the input mains AC voltage increases above the set energy savings voltage, the series bypass contactor (K1) is switched out, and the HF Series Buck AC Voltage Regulator is activated to regulate the output AC voltage to the load at the energy savings voltage level, regardless of the higher and extreme overvoltages on the Distribution network.

What is claimed is:

1. An electrical power distribution system with distributed energy generation, comprising:
    an electrical power distribution network;
    one or more energy processing units each being installed directly at one of one or more points of use;
    wherein each of the energy processing units having an input connection connected to the electrical power distribution network and an output connection connected to one or more of loads and distributed energy generation devices in the point of use at which the energy processing unit is installed;
    wherein each of the energy processing units generates a regulated output voltage at its output from an unregulated input voltage in the electrical power distribution network at the energy processing unit input;
    wherein each of the energy processing units comprises a series voltage regulator and generates its regulated output voltage using a series voltage regulation method;
    wherein each of the energy processing units being electrical bidirectional allowing energy recovery of excess energy generated by any distributed energy generation device in the point of use at which the energy processing unit is installed to be passed back to the energy processing unit input and onto the electrical power distribution network; and
    wherein the regulated output voltage at the output connection of the energy processing unit allowing continuous energy recovery when the unregulated input voltage in the electrical power distribution network is above a regulated upper limit;
    wherein each of the energy processing units is configured to:
        deliver a regulated voltage at its output directly to the point of use;
        allow less accurate output voltages to be set or dynamically controlled to maximize energy savings by KW energy reduction by conservation voltage reduction (CVR) effect;
        allow lower output voltages by compensating wiring voltage drop remotely at furthest one or more mains receptacle to maximize reactive power demand reduction and peak demand billing reduction, and compensate for decreased energy processing unit efficiency under low loads;
        allow control of a grid voltage connected to the input of the energy processing units by decreasing or increasing a total power demand from the grid in KW or KVAR or total apparent power in KVA consumed by the loads by decreasing or increasing respectively the regulated voltage output of each of the energy processing units; and
        allow control of the grid voltage with fine granularity along entire or one or more portions of the electrical Dower distribution network through the use of a bidirectional communication digital network transmitting real time power quality data from each of the energy processing units at each point of load by remotely decreasing or increasing an array of individual energy processing unit output voltages along the electrical Dower distribution network.

2. The system of claim 1,
    wherein each of the energy processing units further comprises a rechargeable battery to reduce or eliminate the KW peak demands for lowering peak demand billing tariff; and
    wherein the rechargeable battery is not used for back up storage.

3. The system of claim 1,
    wherein each of the energy processing units comprises a series voltage regulator and generates its regulated output voltage using a series voltage regulation method combined with at least one of one or more power quality functions; and
    wherein the one or more power quality functions include power factor control, load balancing, voltage balancing, harmonic correction, and frequency control.

4. The system of claim 1, wherein the unregulated input voltage in the electrical power distributed network being allowed a tolerance of ±25% from nominal voltage change, ±10% from nominal voltage unbalance, ±10% from nominal voltage harmonics, low power factor corrected to more than 0.98, ±10% from nominal current unbalance, ±5% from nominal frequency deviation.

5. The system of claim 1, wherein the unregulated input voltage in the electrical power distributed network being allowed a tolerance higher than a legislated electrical power quality standard tolerance.

6. The system of claim 1, wherein the energy processing units being equipped with bidirectional data communication means for data communication with power generators and power transmission operators in the electrical power distribution network.

7. The system of claim 1, wherein the series voltage regulator in each of the energy processing units being a series alternate current high frequency voltage regulator comprising:
    an AC high frequency (HF) series voltage buck power regulator topology for bucking an AC input voltage of an AC input power source, comprising:
        a first and a second independently controllable AC bidirectional switches,
        a first power inductor, and
        a first current transformer for generating a first power inductor current direction data signal indicating the first power inductor current direction;
    an AC HF series voltage boost power regulator topology for boosting the AC input voltage, comprising:
        a third and a forth independently controllable AC bidirectional switches,
        a second power inductor, and
        a second current transformer for generating a second power inductor current direction data signal indicating the second power inductor current direction; and
    a control circuitry for receiving the AC input voltage, an AC reference voltage, the AC output voltage, the first power inductor current direction data signal, and the second power inductor current direction data signal, and generating switch driving signals for the AC bidirectional switches.

8. The system of claim 1, wherein the series voltage regulator in each of the energy processing units being a series alternate current high frequency voltage regulator comprising:

an AC high frequency (HF) series voltage buck power regulator topology for bucking an AC input voltage of an AC input power source, comprising:
  a first unipolar paths, comprising:
    a first half-bridge, comprising a first and a second rectifiers connected in series with a first and a second independently controllable unipolar switches respectively, and
    a first power inductor;
  a second unipolar paths, comprising:
    a second half-bridge, comprising a third and a forth rectifiers connected in series with a third and a forth independently controllable unipolar switches respectively, and
    a second power inductor; and
an AC HF series voltage boost power regulator topology for boosting the AC input voltage, comprising:
  a third unipolar paths, comprising:
    a third half-bridge, comprising a fifth and a sixth rectifiers connected in series with a fifth and a sixth independently controllable unipolar switches respectively, and
    a third power inductor;
  a forth unipolar paths, comprising:
    a forth half-bridge, comprising a seventh and a eighth rectifiers connected in series with a seventh and a eighth independently controllable unipolar switches respectively, and
    a forth power inductor; and
a control circuitry for receiving the AC input voltage, an AC reference voltage, and the AC output voltage, and generating switch driving signals for the unipolar switches;
wherein positive and negative half cycles of AC input voltage being processed separately and independently in either the AC HF series voltage boost power regulator topology or the AC HF series voltage buck power regulator topology at any one time eliminating any power "shoot-through".

9. The system of claim 1, wherein the series voltage regulator in each of the energy processing units being a series alternate current high frequency voltage regulator comprising:
an AC high frequency (HF) series voltage buck power regulator topology for bucking an AC input voltage of an AC input power source;
a bypass contactor;
a bidirectional AC semiconductor device connected in parallel with the bypass contactor,
a control circuitry for receiving the AC input voltage, an AC reference voltage, the AC output voltage, and generating driving signals for the bypass contactor and the bidirectional AC semiconductor device;
wherein under a condition of the AC input voltage falling below a selected optimum energy savings set level, the control circuitry sensing the condition, generating driving signals to activate the bidirectional AC semiconductor device and to transition the bypass contactor such that the bidirectional AC semiconductor device initially bypasses the AC HF series voltage buck power regulator topology, then the bypass contactor contacts close and fully bypass the AC HF series voltage buck power regulator topology and the bidirectional AC semiconductor device.

10. The system of claim 1, wherein each of the energy processing units further comprises a series bypass contactor and achieves energy saving using a conservative voltage reduction method; wherein the conservative voltage reduction method comprises:
  passing the unregulated input voltage through the series voltage regulator when the unregulated input voltage is above the regulated upper limit; and
  passing the unregulated input voltage through the series bypass contactor when the unregulated input voltage is below the regulated upper limit.

11. The system of claim 10, wherein the series voltage regulator in each of the energy processing units being a series alternate current high frequency voltage regulator comprising:
an AC high frequency (HF) series voltage buck power regulator topology for bucking an AC input voltage of an AC input power source, comprising:
  a first and a second independently controllable AC bidirectional switches,
  a first power inductor, and
  a first current transformer for generating a first power inductor current direction data signal indicating the first power inductor current direction;
an AC HF series voltage boost power regulator topology for boosting the AC input voltage, comprising:
  a third and a forth independently controllable AC bidirectional switches,
  a second power inductor, and
  a second current transformer for generating a second power inductor current direction data signal indicating the second power inductor current direction; and
a control circuitry for receiving the AC input voltage, an AC reference voltage, the AC output voltage, the first power inductor current direction data signal, and the second power inductor current direction data signal, and generating switch driving signals for the AC bidirectional switches.

12. The system of claim 10, wherein the series voltage regulator in each of the energy processing units being a series alternate current high frequency voltage regulator comprising:
an AC high frequency (HF) series voltage buck power regulator topology for bucking an AC input voltage of an AC input power source, comprising:
  a first unipolar paths, comprising:
    a first half-bridge, comprising a first and a second rectifiers connected in series with a first and a second independently controllable unipolar switches respectively, and
    a first power inductor;
  a second unipolar paths, comprising:
    a second half-bridge, comprising a third and a forth rectifiers connected in series with a third and a forth independently controllable unipolar switches respectively, and
    a second power inductor; and
an AC HF series voltage boost power regulator topology for boosting the AC input voltage, comprising:
  a third unipolar paths, comprising:
    a third half-bridge, comprising a fifth and a sixth rectifiers connected in series with a fifth and a sixth independently controllable unipolar switches respectively, and
    a third power inductor;
  a forth unipolar paths, comprising:
    a forth half-bridge, comprising a seventh and a eighth rectifiers connected in series with a seventh and a eighth independently controllable unipolar switches respectively, and
a forth power inductor; and
a control circuitry for receiving the AC input voltage, an AC reference voltage, and the AC output voltage, and generating switch driving signals for the unipolar switches;
wherein positive and negative half cycles of AC input voltage being processed separately and independently in either the AC HF series voltage boost power regulator topology or the AC HF series voltage buck power regulator topology at any one time eliminating any power "shoot-through".

13. The system of claim 10, wherein the series voltage regulator in each of the energy processing units being a series alternate current high frequency voltage regulator comprising:
an AC high frequency (HF) series voltage buck power regulator topology for bucking an AC input voltage of an AC input power source;
a bypass contactor;
a bidirectional AC semiconductor device connected in parallel with the bypass contactor;
a control circuitry for receiving the AC input voltage, an AC reference voltage, the AC output voltage, and generating driving signals for the bypass contactor and the bidirectional AC semiconductor device;
wherein under a condition of the AC input voltage falling below a selected optimum energy savings set level, the control circuitry sensing the condition, generating driving signals to activate the bidirectional AC semiconductor device and to transition the bypass contactor such that the bidirectional AC semiconductor device initially bypasses the AC HP series voltage buck power regulator topology, then the bypass contactor contacts close and fully bypass the AC HF series voltage buck power regulator topology and the bidirectional AC semiconductor device.

14. The system of claim 8,
wherein the first and third independently controllable unipolar switches are driven by a first pulse width modulation (PWM) signal;
wherein the second and fourth independently controllable unipolar switches are driven by a second PWM signal;
wherein the first and third rectifiers are controlled by a signal derived from the first PWM signals;
wherein the second and fourth rectifiers are controlled by a signal derived from second PWM signals;
wherein the first and second PWM signals are complementary with each other;
wherein the first and second PWM signals are either non-overlapping with an adjustable dead time between the first and second PWM signals or overlapping with an adjustable overlap time between the first and second PWM signals;
wherein the dead time and the overlap time are dynamically adjusted based on output load level; and
wherein the first and second PWM signals are controlled based on cycle-by-cycle average value feedback, or cycle-by-cycle RMS value feedback.

15. The system of claim 12,
wherein the first and third independently controllable unipolar switches arc driven by a first pulse width modulation (PWM) signal;
wherein the second and fourth independently controllable unipolar switches arc driven by a second PWM signal;
wherein the first and third rectifiers are controlled by a signal derived from the first PWM signals;
wherein the second and fourth rectifiers are controlled by a signal derived from second PWM signals;
wherein the first and second PWM signals are complementary with each other;
wherein the first and second PWM signals are either non-overlapping with an adjustable dead time between the first and second PWM signals or overlapping with an adjustable overlap time between the first and second PWM signals;
wherein the dead time and the overlap time are dynamically adjusted based on output load level; and
wherein the first and second PWM signals are controlled based on cycle-by-cycle average value feedback, or cycle-by-cycle RMS value feedback.

16. An electrical power distribution system with distributed energy generation, comprising one or more energy processing units each being installed directly at one of one or more points of use;
wherein each of the energy processing units being a series alternate current high frequency voltage regulator comprising:
an AC high frequency (HF) series voltage buck power regulator topology for bucking an AC input voltage of an AC input power source, comprising:
a first unipolar paths, comprising:
a first half-bridge, comprising a first and a second rectifiers connected in series with a first and a second independently controllable unipolar switches respectively, and
a first power inductor,
a second unipolar paths, comprising:
a second half-bridge, comprising a third and a forth rectifiers connected in series with a third and a forth independently controllable unipolar switches respectively, and
a second power inductor; and
an AC HF series voltage boost power regulator topology for boosting the AC input voltage, comprising:
a third unipolar paths, comprising:
a third half-bridge, comprising a fifth and a sixth rectifiers connected in series with a filth and a sixth independently controllable unipolar switches respectively, and
a third power inductor;
a forth unipolar paths, comprising:
a forth half-bridge, comprising a seventh and a eighth rectifiers connected in series with a seventh and a eighth independently controllable unipolar switches respectively, and
a forth power inductor; and
a control circuitry for receiving the AC input voltage, an AC reference voltage, and the AC output voltage, and generating switch driving signals for the unipolar switches;
wherein positive and negative half cycles of AC input voltage being processed separately and independently in either the AC HF series voltage boost power regulator topology or the AC HF series voltage buck power regulator topology at any one time eliminating any power "shoot-through";
wherein each of the energy processing units is configured to:
deliver a regulated voltage at its output directly to the point of use;

allow less accurate output voltages to be set or dynamically controlled to maximize energy savings by KW energy reduction b conservation voltage reduction (CVR) effect;

allow lower output voltages by compensating wiring voltage drop remotely at furthest one or more mains receptacle to maximize reactive power demand reduction and peak demand billing reduction, and compensate for decreased energy processing unit efficiency under low loads;

allow control of a grid voltage connected to the input of the energy processing units by decreasing or increasing a total power demand from the grid in KW or KVAR or total apparent power in KVA consumed by the loads by decreasing or increasing respectively the regulated voltage output of each of the energy processing units; and allow control of the grid voltage with fine granularity along entire or one or more portions of the electrical power distribution network through the use of a bidirectional communication digital network transmitting real time power quality data from each of the energy processing units at each point of load by remotely decreasing or increasing an array of individual energy processing unit output voltages along the electrical power distribution network.

17. The system of claim 16,
wherein the first and third independently controllable unipolar switches are driven by a first pulse width modulation (PWM) signal;
wherein the second and fourth independently controllable unipolar switches are driven by a second PWM signal;
wherein the first and third rectifiers are controlled by a signal derived from the first PWM signals;
wherein the second and fourth rectifiers are controlled by a signal derived from second PWM signals;
wherein the first and second PWM signals are complementary with each other;
wherein the first and second PWM signals arc either non-overlapping with an adjustable dead time between the first and second PWM signals or overlapping with an adjustable overlap time between the first and second PWM signals;
wherein the dead time and the overlap time are dynamically adjusted based on output load level; and
wherein the first and second PWM signals are controlled based on cycle-by-cycle average value feedback, or cycle-by-cycle RMS value feedback.

* * * * *